(12) United States Patent
Engerman

(10) Patent No.: US 12,253,126 B2
(45) Date of Patent: Mar. 18, 2025

(54) ELECTRIC DRIVE AXLE SYSTEM WITH A SELF-INDEXING CLUTCH AND METHOD FOR OPERATION OF SAID CLUTCH

(71) Applicant: Dana Automotive Systems Group, LLC, Maumee, OH (US)

(72) Inventor: Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 242 days.

(21) Appl. No.: 17/931,848

(22) Filed: Sep. 13, 2022

(65) Prior Publication Data

US 2023/0003266 A1     Jan. 5, 2023

Related U.S. Application Data

(63) Continuation of application No. 16/794,703, filed on Feb. 19, 2020, now Pat. No. 11,480,222.

(51) Int. Cl.

| | |
|---|---|
| *F16D 11/14* | (2006.01) |
| *F16D 47/04* | (2006.01) |
| *F16D 48/06* | (2006.01) |
| *F16H 61/686* | (2006.01) |
| *B60K 6/36* | (2007.10) |
| *B60K 6/383* | (2007.10) |
| *F16H 57/00* | (2012.01) |

(52) U.S. Cl.
CPC ............. *F16D 47/04* (2013.01); *F16D 48/06* (2013.01); *F16H 61/686* (2013.01); *B60K 6/36* (2013.01); *B60K 6/383* (2013.01); *B60Y 2200/92* (2013.01); *F16H 57/0006* (2013.01)

(58) Field of Classification Search
CPC ....................................................... F16D 47/04
See application file for complete search history.

(56) References Cited

U.S. PATENT DOCUMENTS

| | | | |
|---|---|---|---|
| 4,932,809 A | * | 6/1990 | Kopp ........................ F16D 3/02 403/1 |
| 5,538,119 A | | 7/1996 | Johnson, Jr. |
| 6,065,898 A | | 5/2000 | Hale |
| 8,602,188 B2 | | 12/2013 | Louis |
| 10,256,825 B2 | | 4/2019 | Arai |
| 11,148,526 B2 | | 10/2021 | Engerman |
| 11,235,660 B2 | | 2/2022 | Engerman |
| 11,236,804 B2 | | 2/2022 | Engerman et al. |

(Continued)

*Primary Examiner* — Stacey A Fluhart
(74) *Attorney, Agent, or Firm* — McCoy Russell LLP

(57) ABSTRACT

Methods and systems for a clutch assembly in an electric drive axle of a vehicle are provided. In one example, a clutch assembly in a gear train is provided that includes a locking clutch. The locking clutch includes a gear including a plurality of teeth having at least one tooth with a tapered end, an indexing shaft rotationally connected to an output shaft, a shift collar mounted on the indexing shaft, configured to translate on the indexing shaft into an engaged and disengaged configuration, and including a plurality of teeth on a face, where at least one tooth in the plurality of teeth in the shift collar includes a tapered end, and an indexing mechanism coupled to the shift collar and the indexing shaft and configured to accommodate for indexing between the indexing shaft and the shift collar during shift collar engagement.

19 Claims, 13 Drawing Sheets

(56) References Cited

U.S. PATENT DOCUMENTS

| | | |
|---|---|---|
| 11,440,417 B2 | 9/2022 | Nahrwold et al. |
| 2010/0276245 A1* | 11/2010 | Umeno ................. F16D 27/118 |
| | | 192/69.81 |
| 2015/0027255 A1* | 1/2015 | Kume ................... F16D 23/025 |
| | | 74/339 |
| 2015/0330506 A1* | 11/2015 | Volpert ................... F16D 11/04 |
| | | 74/473.36 |
| 2016/0017968 A1* | 1/2016 | Kaltenbach ........... F16H 37/046 |
| | | 475/198 |
| 2018/0266520 A1 | 9/2018 | Park |
| 2018/0372167 A1 | 12/2018 | Choi et al. |
| 2019/0301576 A1* | 10/2019 | Harada ............... F16H 37/0813 |
| 2020/0283067 A1* | 9/2020 | Reineke ................ B62D 25/20 |
| 2021/0071741 A1* | 3/2021 | Choi .................... F16H 63/304 |
| 2021/0252958 A1 | 8/2021 | Engerman |
| 2021/0252976 A1 | 8/2021 | Nahrwold |
| 2021/0252977 A1 | 8/2021 | Engerman |
| 2021/0253101 A1 | 8/2021 | Nahrwold |
| 2021/0254677 A1 | 8/2021 | Wesolowski et al. |

\* cited by examiner

ELECTRIC DRIVE AXLE SYSTEM WITH A SELF-INDEXING CLUTCH AND METHOD FOR OPERATION OF SAID CLUTCH

CROSS REFERENCE TO RELATED APPLICATION

The present application is a continuation of U.S. non-provisional patent application Ser. No. 16/794,703, entitled "ELECTRIC DRIVE AXLE SYSTEM WITH A SELF-INDEXING CLUTCH AND METHOD FOR OPERATION OF SAID CLUTCH", and filed on Feb. 19, 2020. The entire contents of the above-listed application are hereby incorporated by reference for all purposes.

FIELD

The present disclosure relates to an electric drive axle system in a vehicle, and more particularly to a self-indexing clutch in the electric drive axle system and method for operation of the self-indexing clutch.

BACKGROUND

Electrified axles have been incorporated into electric as well as hybrid vehicles to provide or augment vehicle propulsion. The electrified axles have included gearboxes with clutches allowing the gear ratio in the gearbox to be adapted based on various operating conditions. Dog clutches have been deployed in gearboxes in electrified drive axles as well as combustion engine transmissions. Synchronization mechanisms, commonly referred to as synchromesh devices, are utilized in automatic transmissions to facilitate smooth dog clutch engagement and avoid noise, vibration, and harshness (NVH) occurring when clutch teeth are in a blocked position during clutch engagement. Certain electrified axle gearboxes have also utilized dog clutches designed to engage and disengage gearbox components such as planetary gears.

However, the inventors have recognized several drawbacks with previous electric drive axles and clutches. For instance, previous electric drive axles have not achieved a desired amount of gear selectability. Furthermore, dog clutches when paired with other gearboxes clutches may not be able to smoothly engage due to constraints on the dog clutch by other clutches. Consequently, blocked shift conditions may occur in the dog clutch, in certain scenarios, leading to increased NVH and shift delays in the gearbox. Customer satisfaction may be decreased as a result of the elevated NVH levels and shift delays.

SUMMARY

To overcome at least some of the aforementioned drawbacks a clutch assembly is provided. The clutch assembly comprises, in one example, a locking clutch with a gear including a plurality of teeth having at least one tooth with a tapered end. The locking clutch further includes an indexing shaft rotationally connected to an output shaft and a shift collar mounted on the indexing shaft. The locking clutch is also configured to translate on the indexing shaft into an engaged and disengaged configuration and includes a plurality of teeth on a face. At least one tooth in the plurality of teeth in the shift collar includes a tapered end. The locking clutch further includes an indexing mechanism coupled to the shift collar and the indexing shaft. The indexing mechanism allows for indexing between the indexing shaft and the shift collar during shift collar engagement. In this way, the profile of the clutch teeth and indexing mechanism work in conjunction to decrease the likelihood of a blocked condition in the clutch. As a result, noise, vibration, and harshness (NVH) emanating from the clutch assembly is reduced along with the likelihood of clutch shift delay and malfunction.

In another example, the indexing mechanism may be configured to inhibit indexing between the indexing shaft and the shift collar caused by inertial load during gear train operation. In this way, the indexing mechanism allows for shift collar indexing during clutch engagement but prevents unwanted indexing during other modes of gear train operation, further decreasing NVH in the gear train.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A locking clutch with self-indexing functionality in a gear train of an electric drive axle allowing clutch teeth to smoothly land in a mated position during engagement, is described herein. To achieve the smooth tooth engagement the locking clutch includes teeth with tapered ends and an indexing mechanism allowing for rotational "compliance" between a shift collar and an indexing shaft in the clutch. As such, when the teeth are in a blocked position with regard to one another, as the shift collar teeth are pushed toward the gear teeth the shift collar is allowed to index and the shift collar teeth slide into mated engagement with the gear teeth. Consequently, clutch noise, vibration, and harshness (NVH) may be reduced and the chance of clutch shift delays and in some case malfunction may be decreased. Further, in one example, the indexing mechanism may be configured to substantially inhibit indexing between the shift collar and the indexing shaft caused by inertial load during gear train operation. In this way, indexing may be avoided in the clutch during gear train operating modes outside of clutch engagement, further decreasing NVH emanating from the locking clutch.

Figure 1:
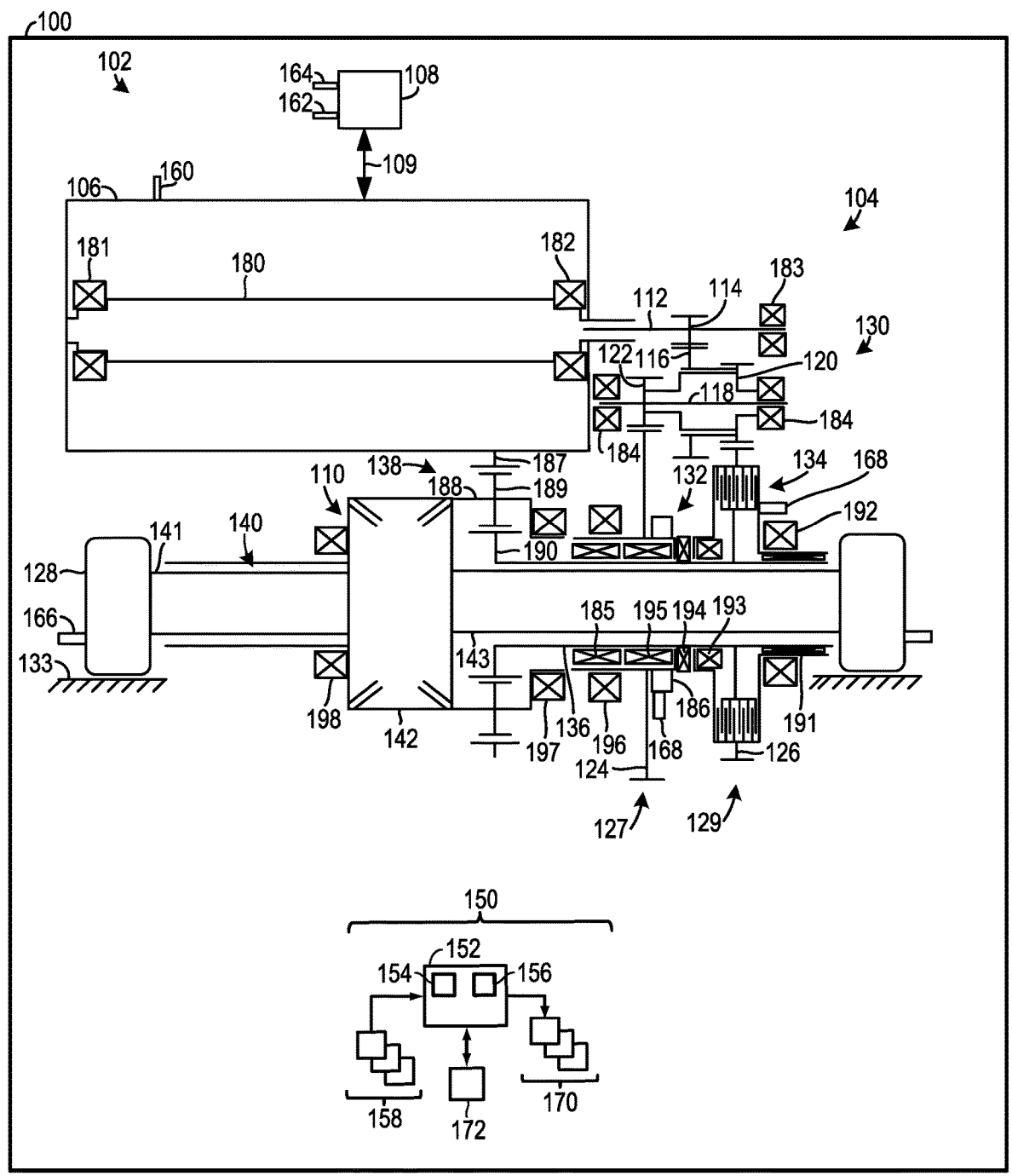
FIG. 1 is a schematic representation of a vehicle including an electric drive axle system.
Figure 2:
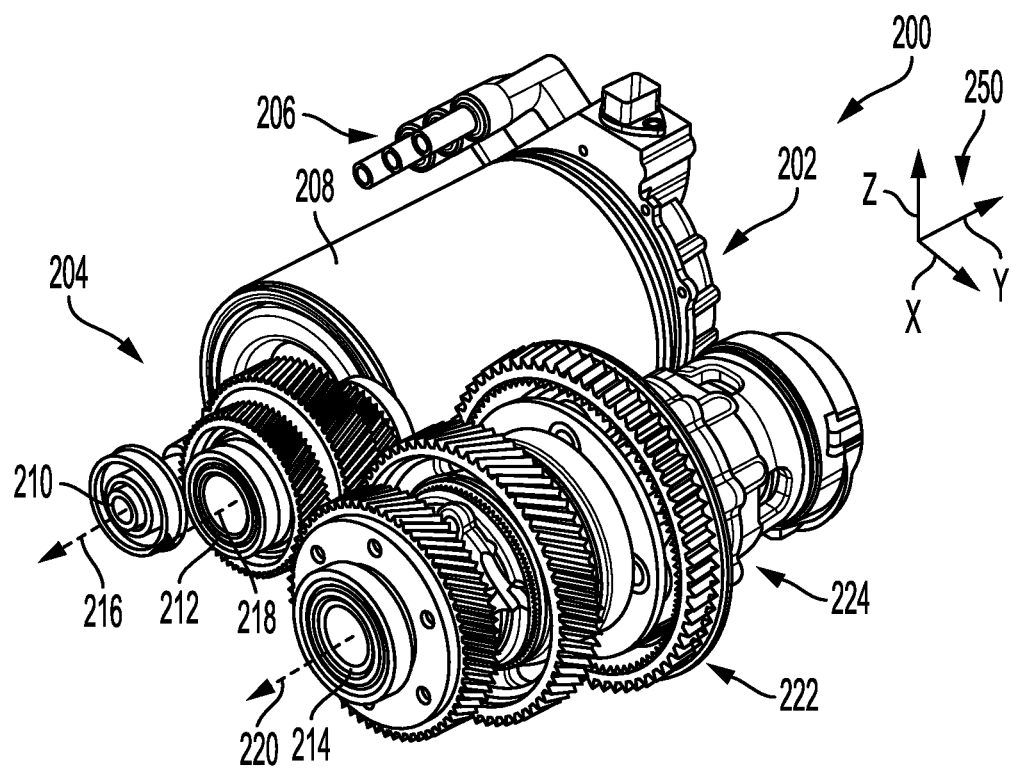
FIG. 2 shows a perspective view of an example of an electric drive axle system with a gear train having multiple selectable gear sets.
Figure 3:
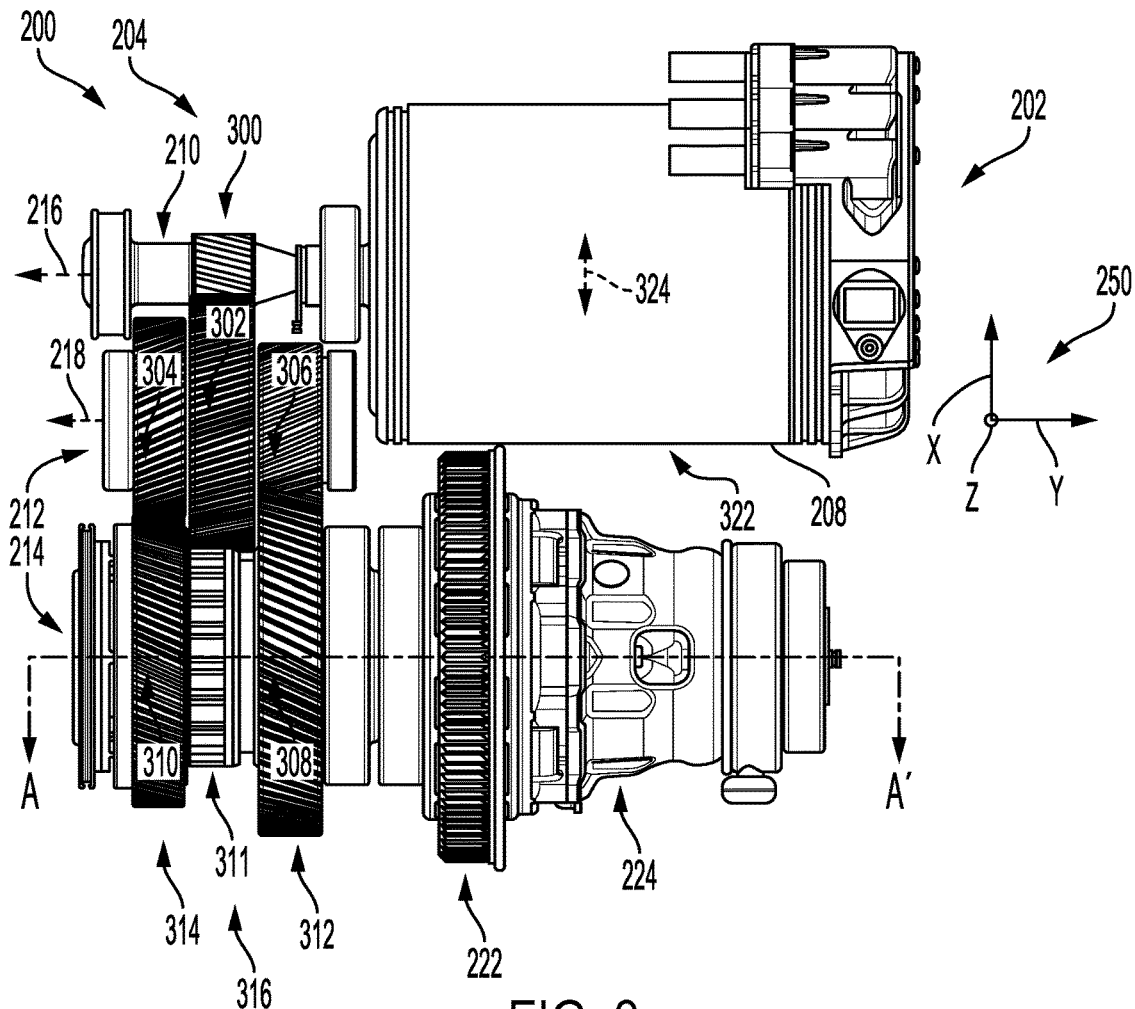
FIG. 3 shows a top view of the electric drive axle system, depicted in FIG. 2.
Figure 4:
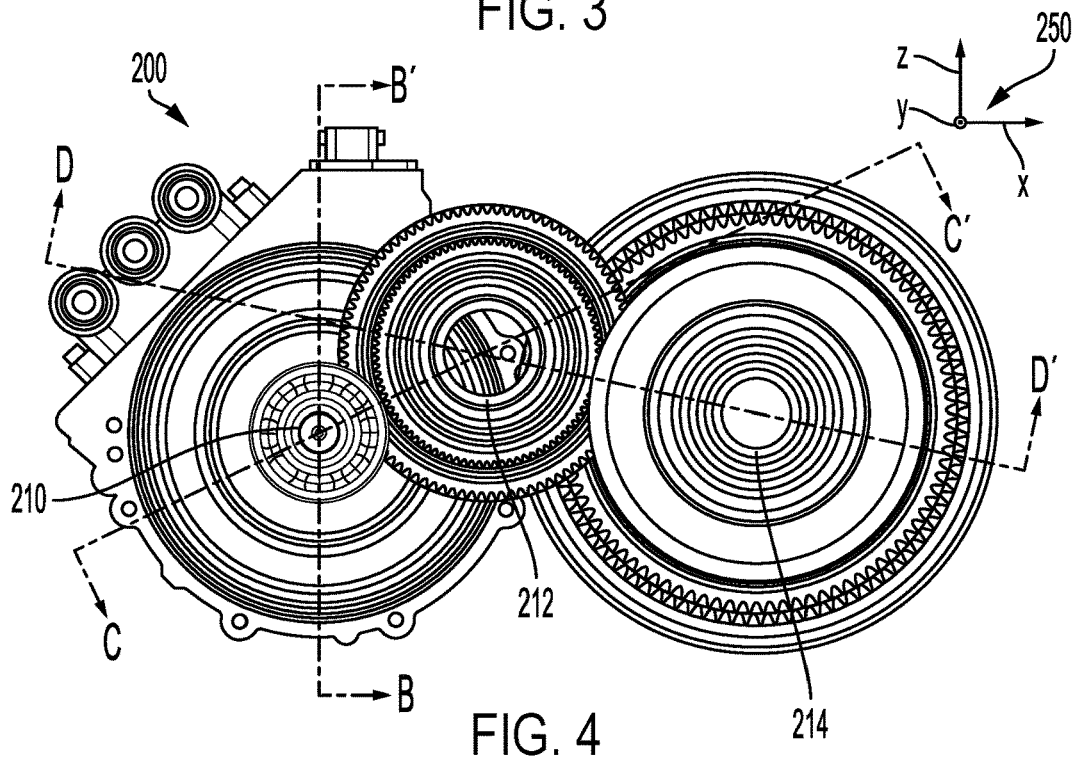
FIG. 4 shows a side view of the electric drive axle system, depicted in FIG. 2.
Figure 5:
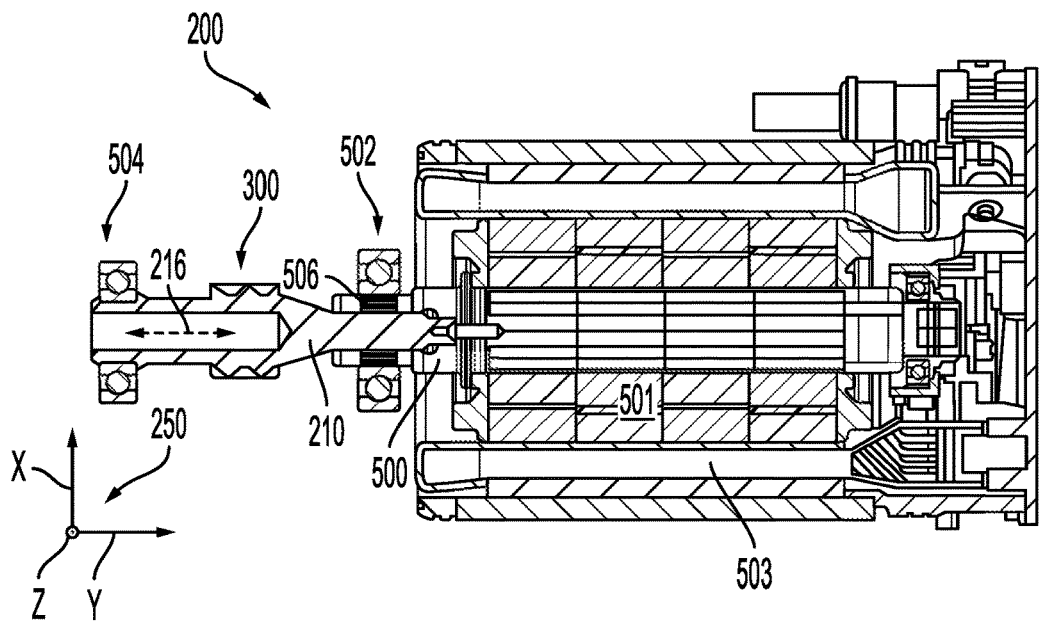
FIG. 5 shows a cross-sectional view of an electric motor-generator and input shaft in the electric drive axle system, depicted in FIG. 2.
Figure 6:
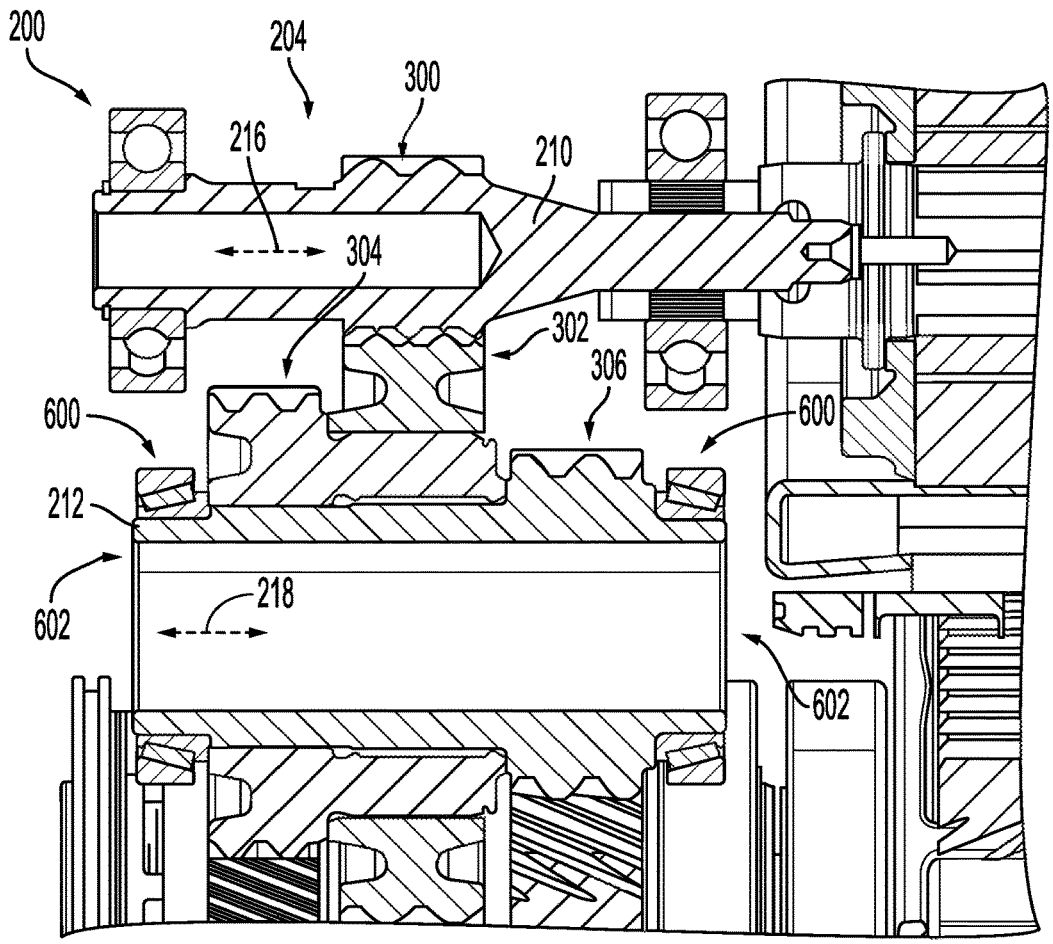
FIG. 6 shows a cross-sectional view of an intermediate shaft in the gear train of the electric drive axle system, depicted in FIG. 2.
Figure 7:
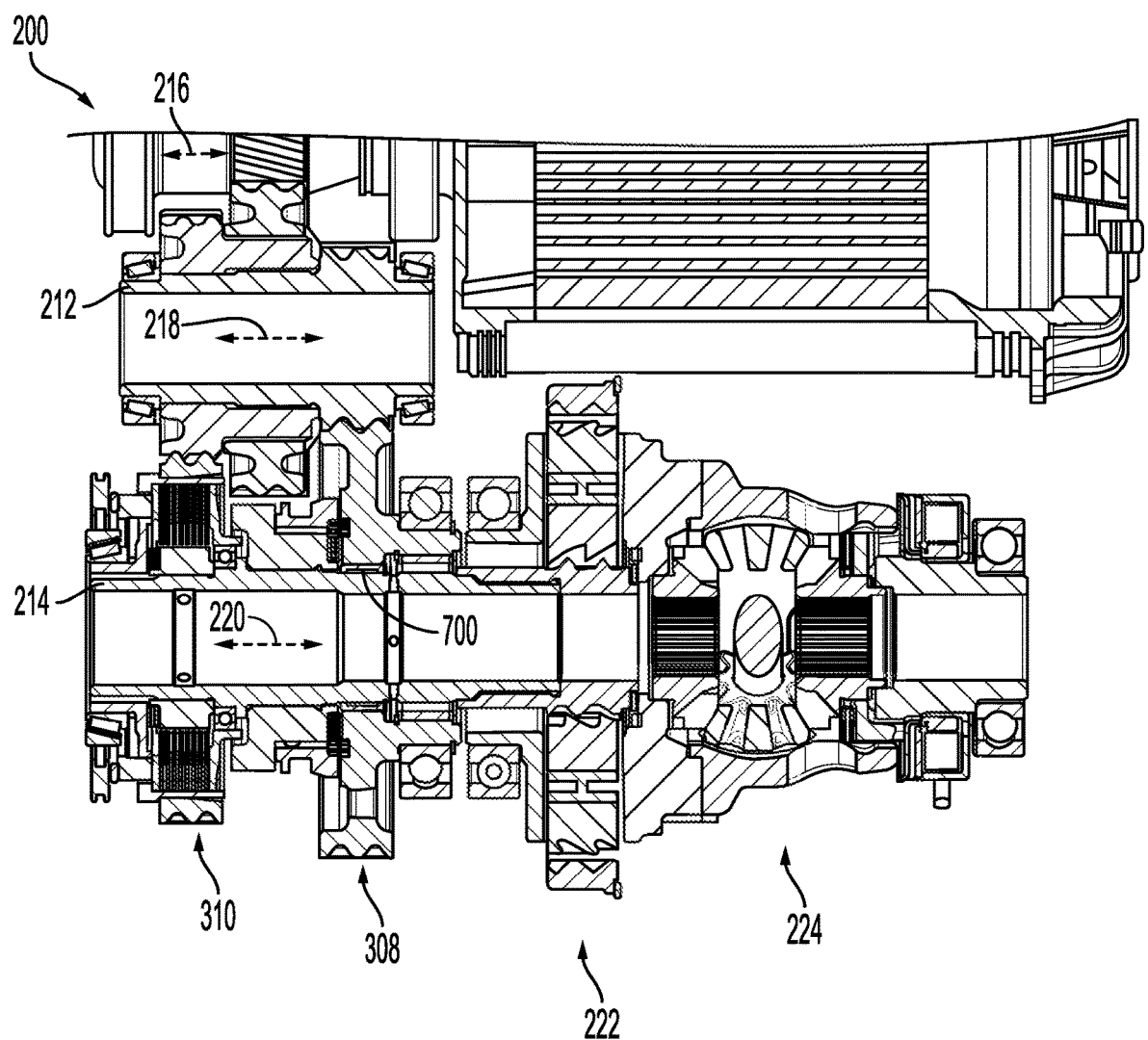
FIG. 7 shows a cross-sectional view of an output shaft, planetary gear assembly, and differential in the gear train of the electric drive axle system, depicted in FIG. 2.
Figures 8, 9:
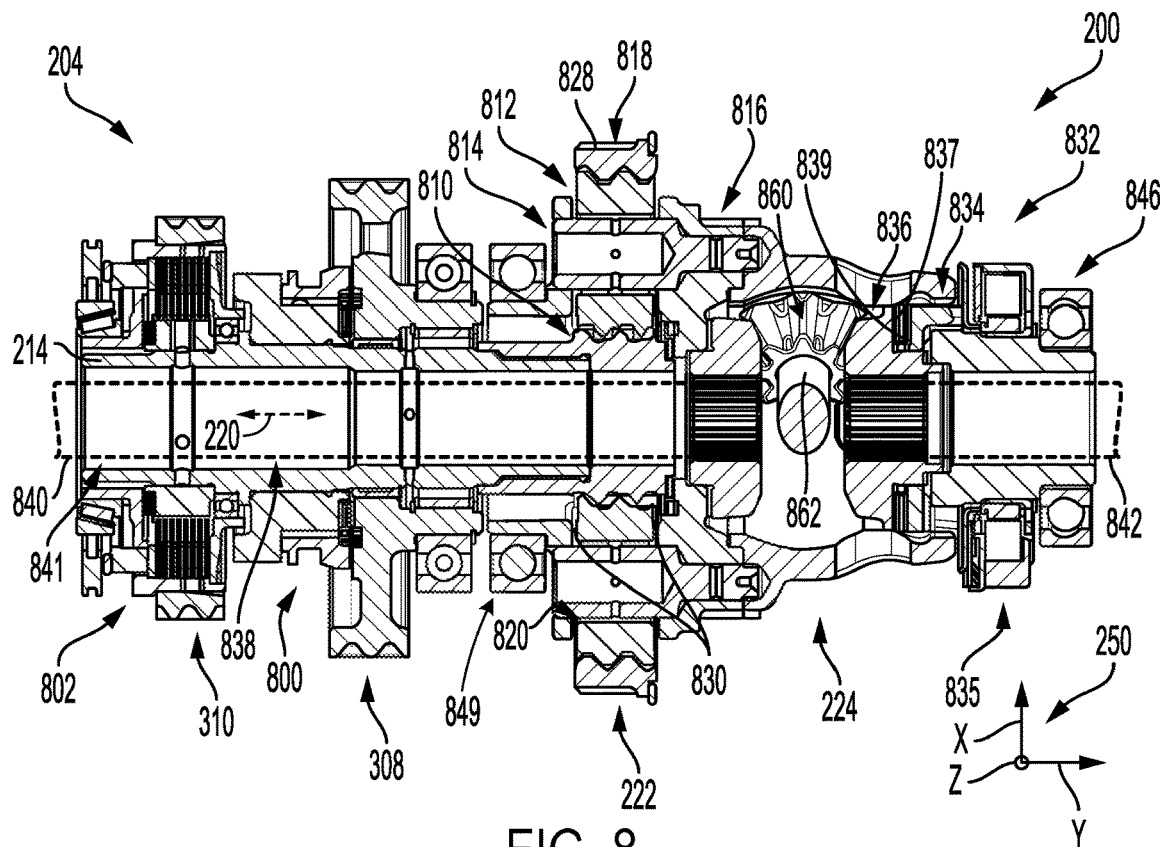
FIG. 8 shows a detailed view of the output shaft, planetary gear assembly, and differential in the gear train of the electric drive axle system, depicted in FIG. 2.
FIG. 9 shows a detailed view of the clutch assemblies in the gear train of the electric drive axle system, depicted in FIG. 2.
Figure 10:
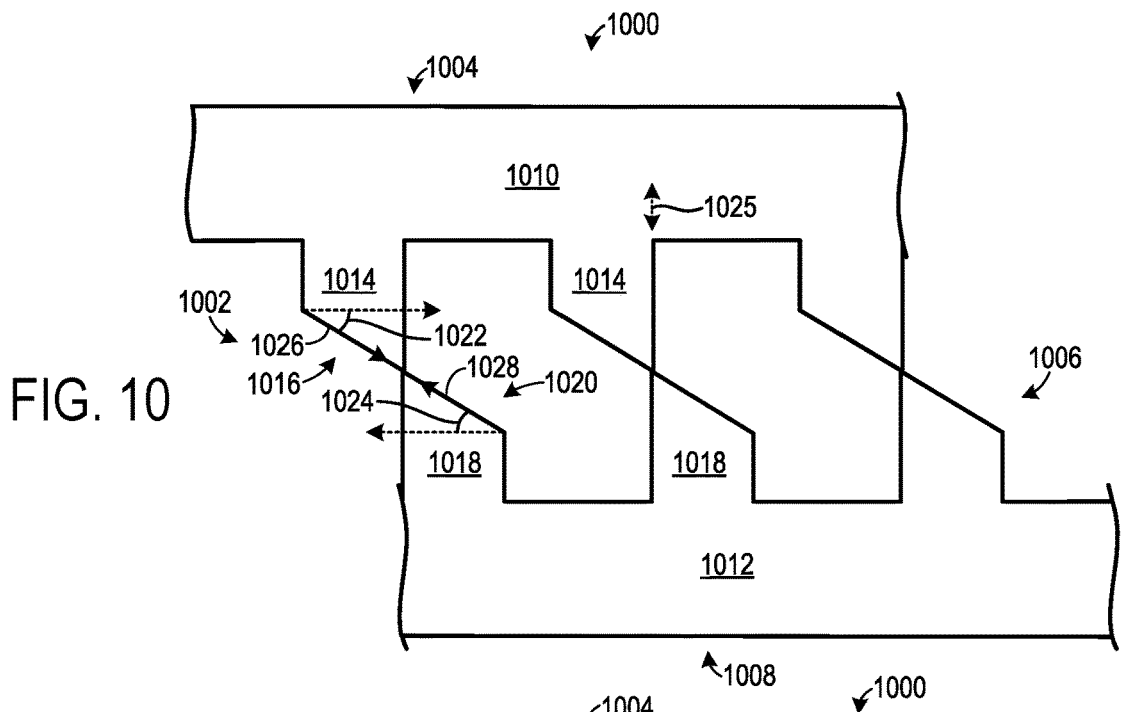
FIGS. 10-12 show an engagement sequence in an example of a locking clutch.
Figure 11:
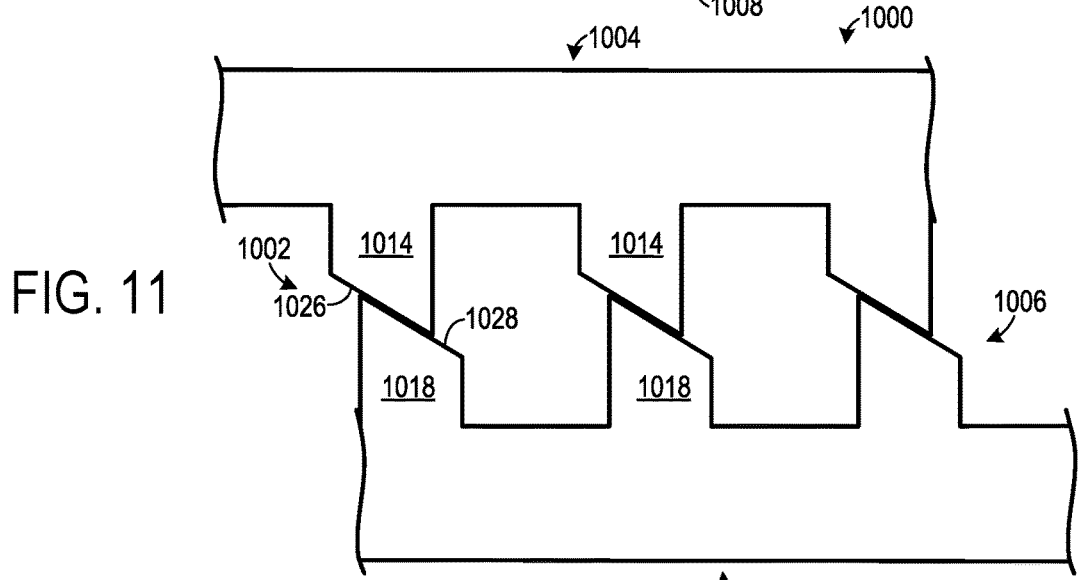
Figure 12:
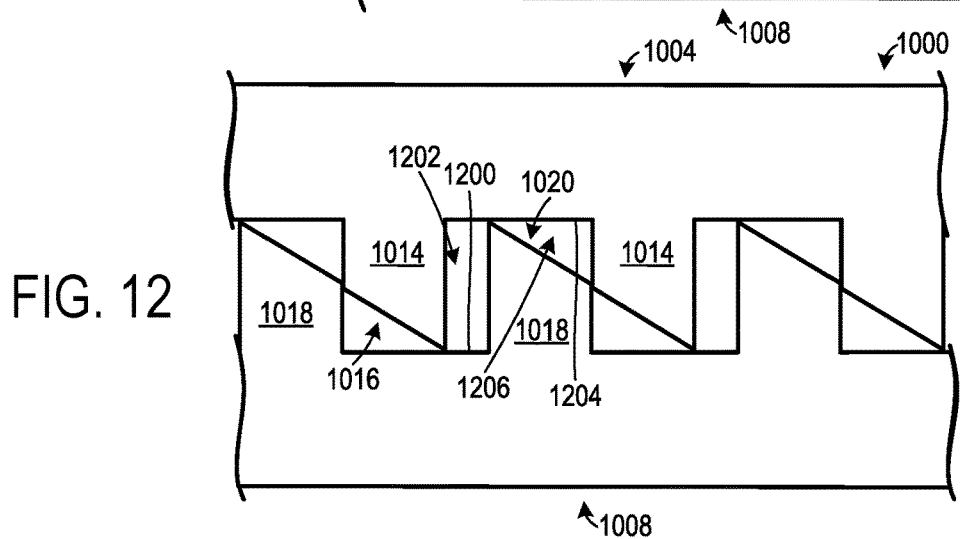
Figure 13:
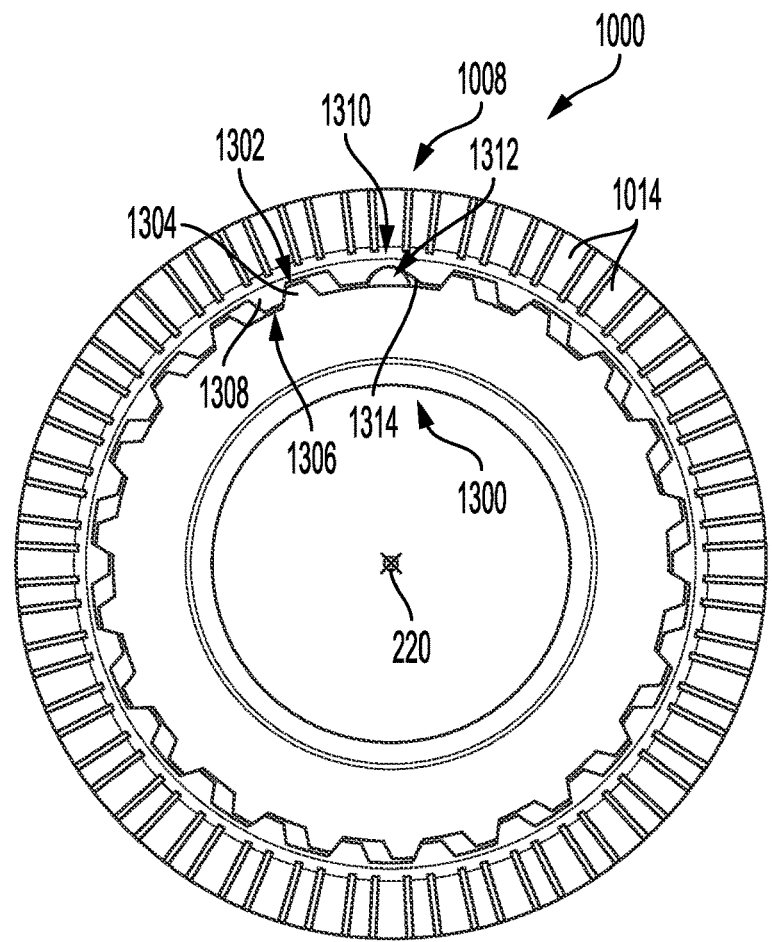
FIG. 13 shows a side view of an indexing shaft and a face of a shift collar in a locking clutch.
Figure 14:
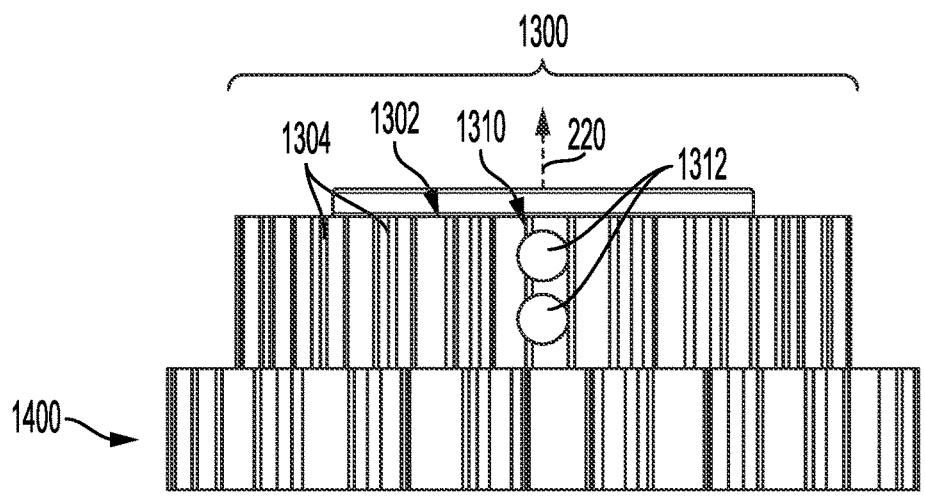
FIG. 14 shows a top view of the indexing shaft, depicted in FIG. 13.
Figure 15:
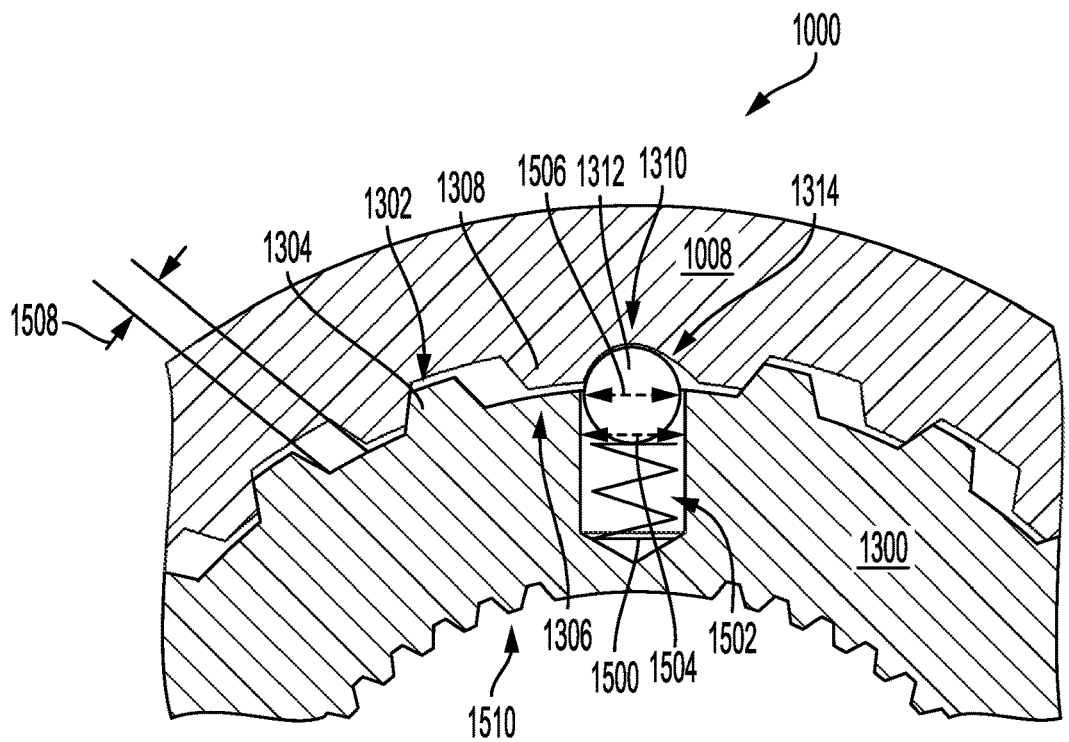
FIGS. 15-16 show different cross-sectional views of an example of an indexing mechanism in an indexing shaft and a shift collar.
Figure 16:
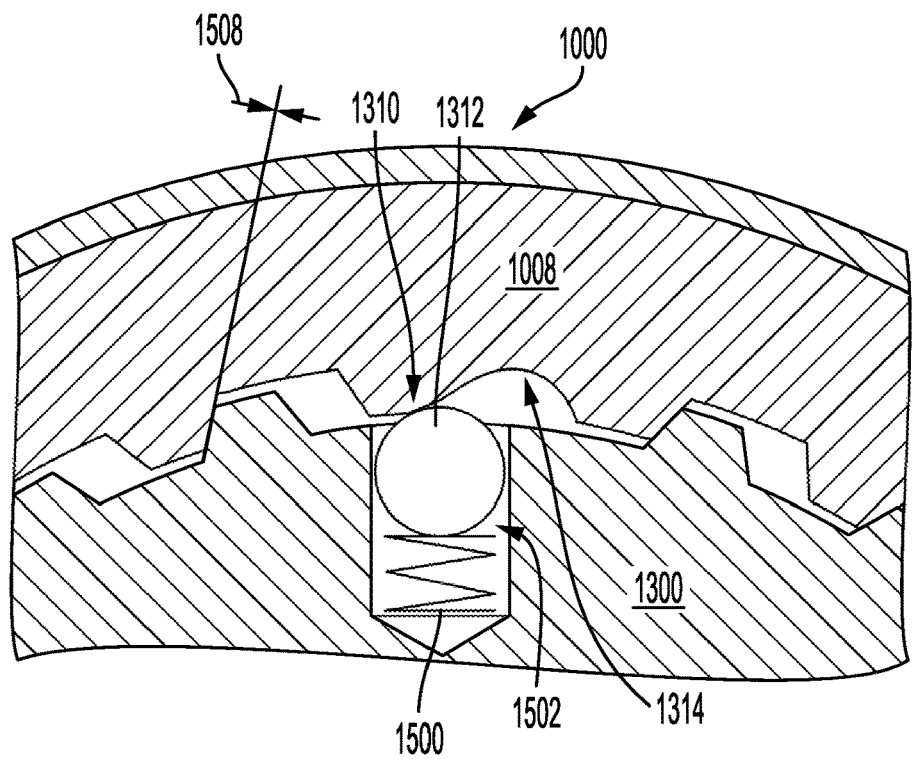
Figure 17:
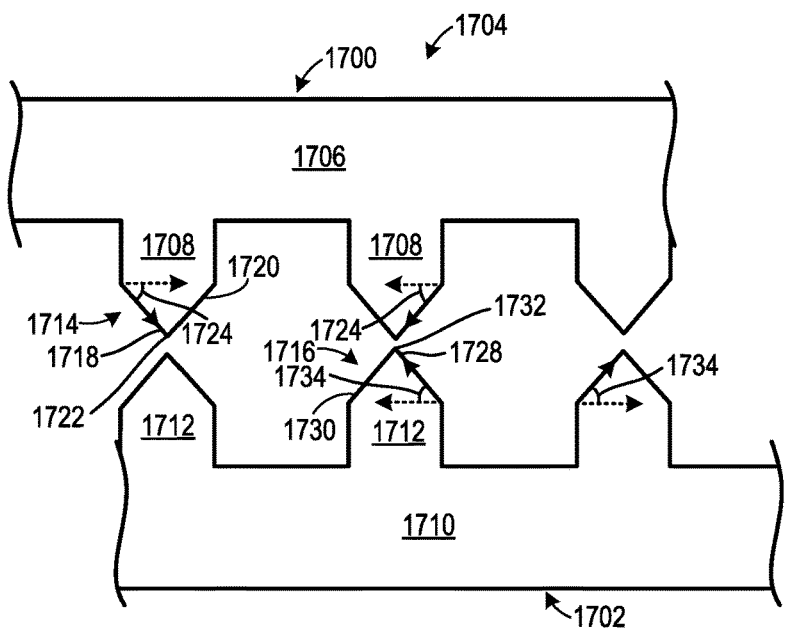
FIG. 17 shows another example of an indexing shaft and a shift collar in a locking clutch.
Figure 18:
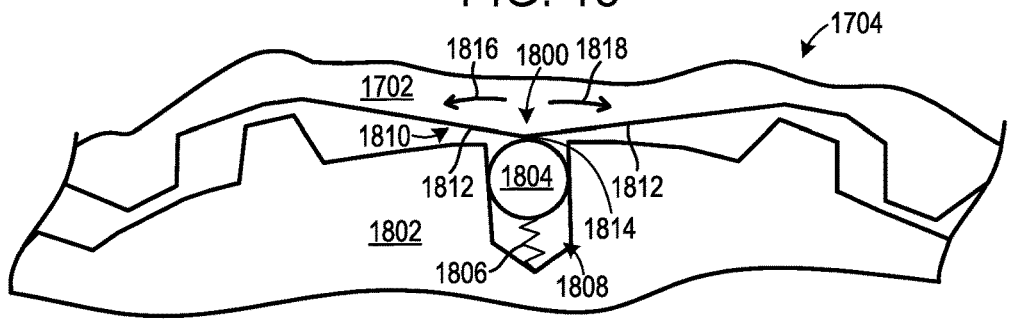
FIG. 18 shows an example of an indexing mechanism in the locking clutch, depicted in FIG. 17.
Figure 19:
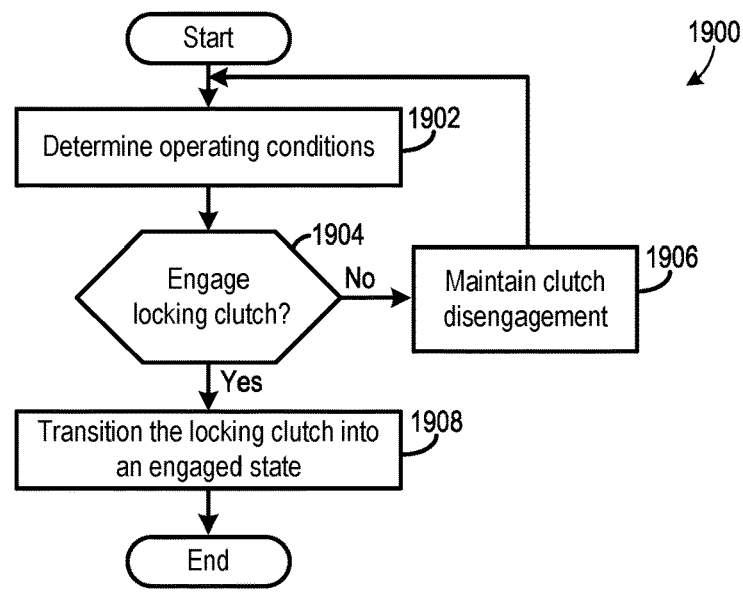
FIG. 19 shows a method for operation of a clutch assembly in an electric drive axle system.
Figure 20:
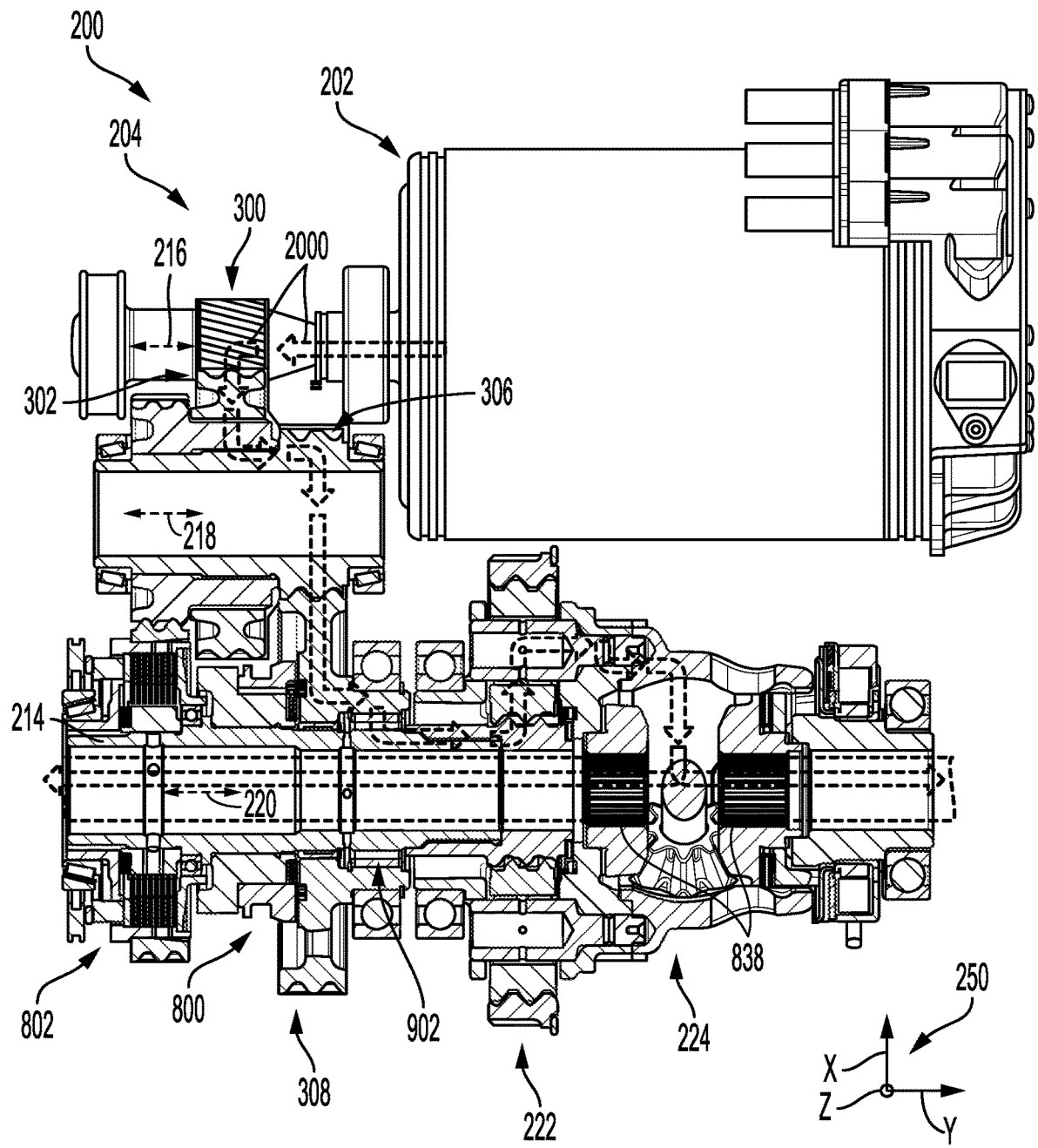
FIGS. 20-22 show power paths for different operating modalities of the electric drive axle system, shown in FIG. 2.
Figure 21:
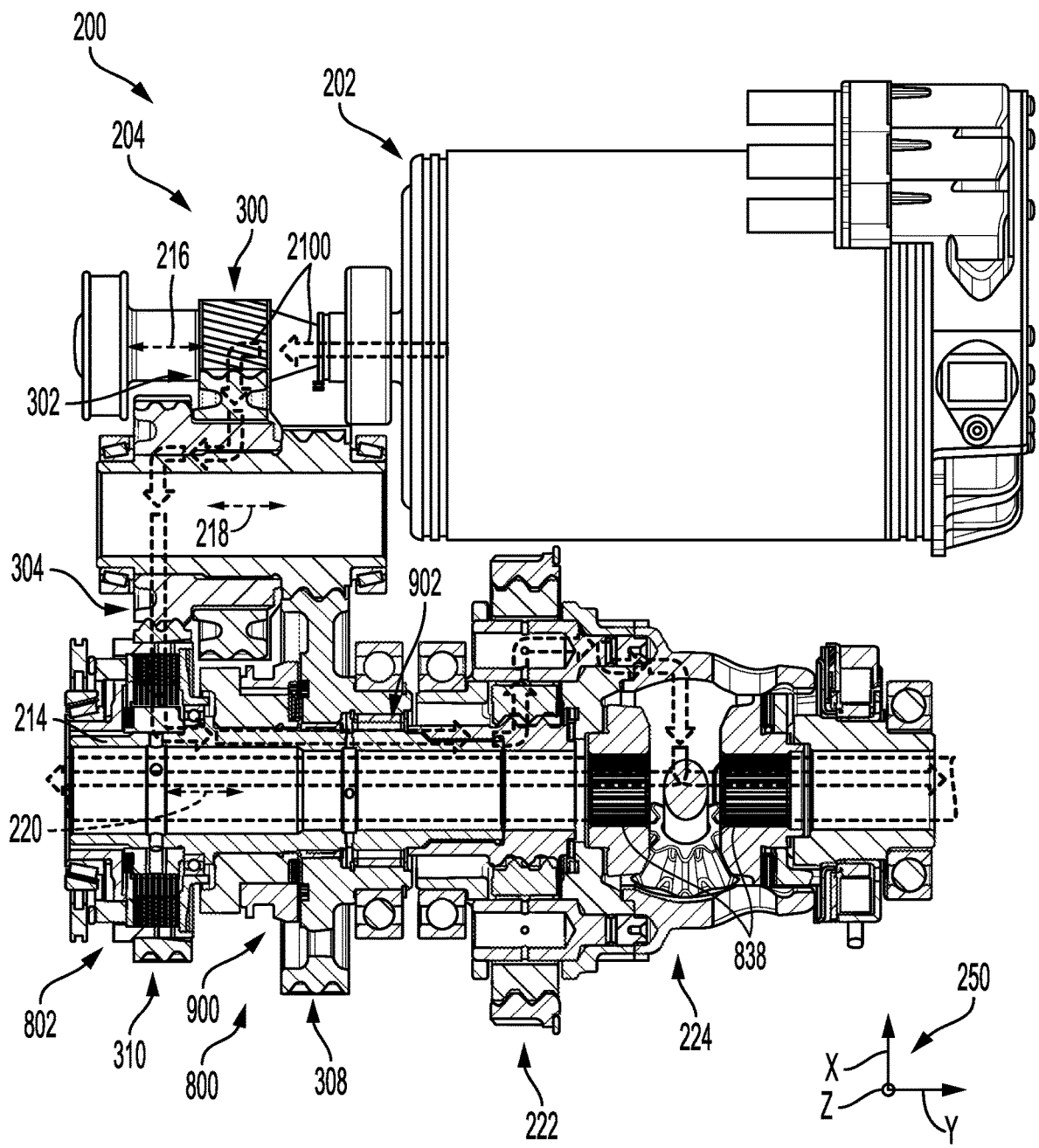
Figure 22:
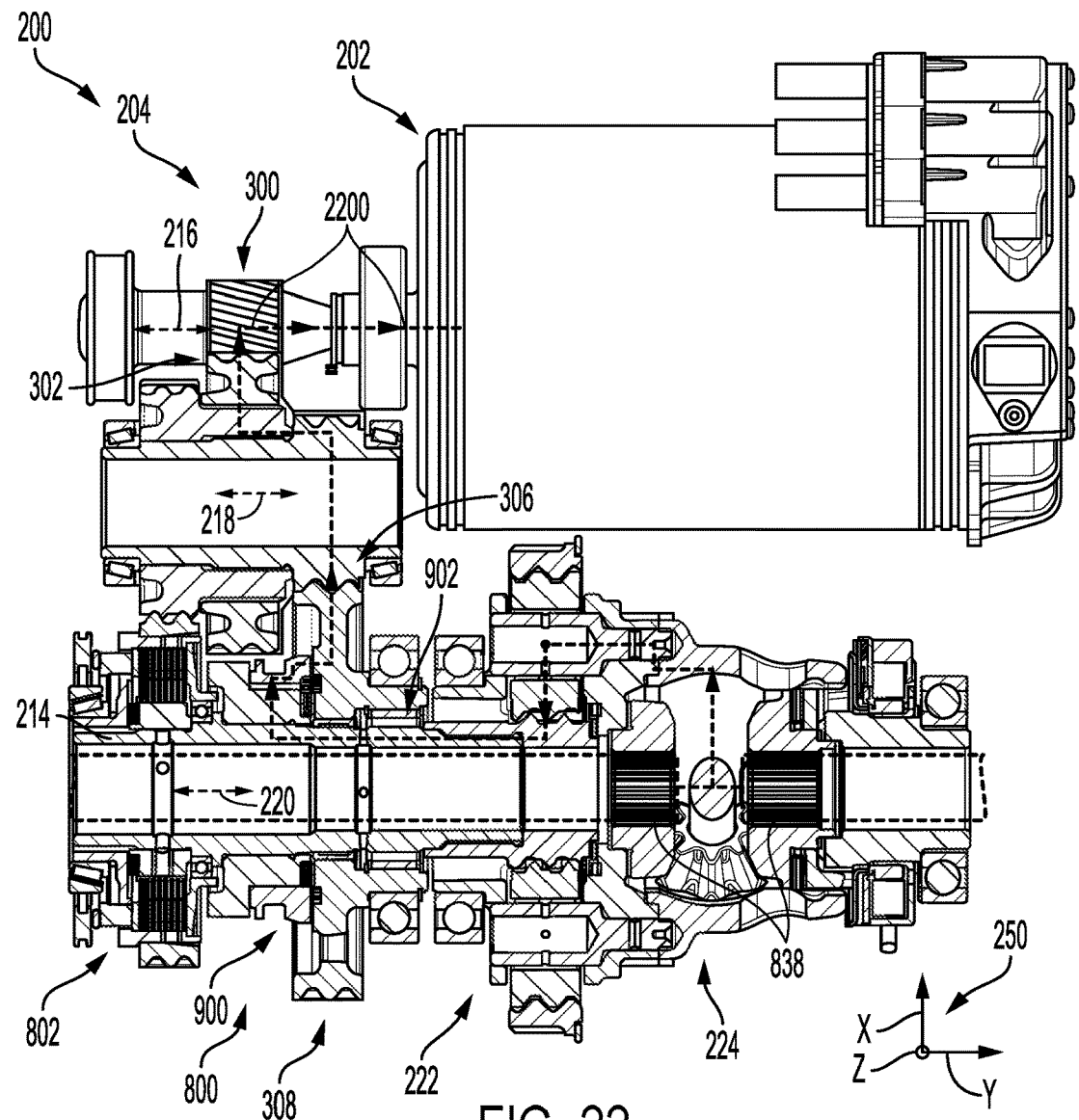
Figure 23:
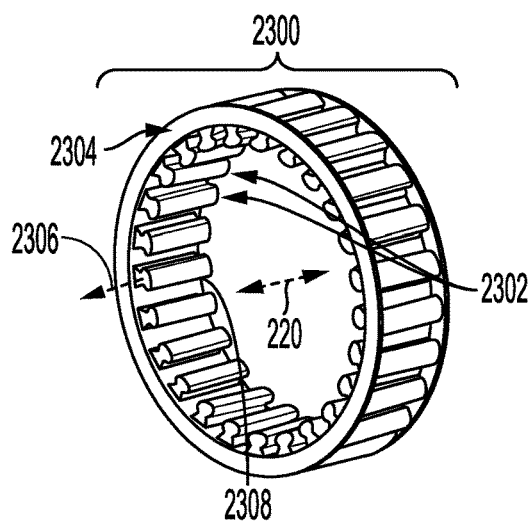
FIG. 23 shows an example of a one-way clutch.

FIG. 1 schematically illustrates a vehicle with an electric drive axle system designed with multiple gear ratios. FIGS. 2-4 illustrate different views of an example of an electric drive axle system. FIG. 5 shows a cross-sectional view of an electric motor-generator included in the electric drive axle system, shown in FIG. 4. FIG. 6 shows a cross-sectional view of an input shaft and intermediate shaft included in a gear train in the electric drive axle system, shown in FIG. 4. FIG. 7 shows a cross-sectional view of an intermediate shaft and an output shaft in the gear train in the electric drive axle system, shown in FIG. 4. FIG. 8 shows a cross-sectional view of the output shaft included in the gear train in the electric drive axle system, shown in FIG. 4. FIG. 9 shows a detailed view of clutch assemblies in the electric drive axle system, shown in FIG. 4. FIGS. 10-12 show an engagement sequence in an interface of a locking clutch. FIGS. 13-14 show different views of an indexing shaft and a face of a shift collar in a locking clutch. FIGS. 15-16 show different cross-sectional views of an example of an indexing mechanism in an indexing shaft and the shift collar. FIG. 17 shows another example of an indexing shaft and a shift collar in a locking clutch. FIG. 18 shows an indexing mechanism included in the locking clutch, depicted in FIG. 17. FIG. 19 shows a method for operation of a clutch assembly in an electric drive axle system. FIGS. 20-22 show exemplary gear train power paths occurring during different modes of system operation. FIG. 23 shows an exemplary embodiment of a one-way clutch. Exemplary as expressed herein does not give any sort of preferential indication but rather denotes potential aspects of the system.

FIG. 1 shows a schematic depiction of a vehicle 100 having an electric drive axle system 102 with a gear train 104 and an electric motor-generator 106. The stick diagram of FIG. 1 provides a high-level topology of the vehicle, gear train, and corresponding components. However, it will be understood that the vehicle, gear train, and corresponding components have greater structural complexity than is captured in FIG. 1. The structural details of various facets of the gear train 104 are illustrated, by way of example, in greater detail herein with regard to FIGS. 2-18 and 20-23.

The electric motor-generator 106 is electrically coupled to an energy storage device 108 (e.g., battery, capacitor, and the like). Arrows 109 signify the energy transfer between the electric motor-generator 106 and the energy storage device 108 that may occur during different modes of system operation. The electric motor-generator 106 may include conventional components for generating rotational output (e.g., forward and reverse drive rotational output) and/or electrical energy for recharging the energy storage device 108 such as a rotor electromagnetically interacting with a stator, to provide the aforementioned energy transfer functionality. The electric motor-generator 106 is shown including a rotor shaft 180 with a first bearing 181 and a second bearing 182 coupled thereto. The first bearing 181 may be a fixed bearing and the second bearing 182 may be a floating bearing. Although the second bearing 182 is shown positioned within the motor-generator, it will be understood that in some embodiments, bearing 182 may be coupled to the input shaft to facilitate rotation thereof. Other bearing arrangements with regard to the motor-generator have been contemplated such as arrangements with alternate quantities and/or types of bearings.

The vehicle may take a variety of forms in different embodiments. For example, the vehicle 100 may be hybrid vehicle where both the electric motor-generator 106 and an internal combustion engine (not shown) are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to a differential 110 or other suitable locations in the gear train 104. In yet another use-case hybrid vehicle configuration, the engine may provide rotational input to another drive axle (not shown). Further, in other examples, the vehicle may be a battery electric vehicle (BEV) where the internal combustion engine is omitted.

The rotor shaft 180 of the electric motor-generator 106 is coupled to an input shaft 112. For instance, the rotor shaft 180 may be transition fit, slip fit, mechanically attached, in splined engagement, combinations thereof, etc., with an end of the input shaft 112. A first gear 114 is positioned or formed on the input shaft 112. A bearing 183 is shown coupled to the input shaft 112. The bearing 183 may be a fixed bearing, in one example. However, in other examples, the bearing 183 may be another suitable type of bearing or in some cases may be omitted from the system.

A second gear 116 is rotationally coupled to the first gear 114 and resides on an intermediate shaft 118. As described herein, rotational coupling between gears or other components may include an interface between the gears where teeth of the gears mesh to facilitate rotational energy transfer therebetween. As such, rotational coupling of the components allows for rotational energy transfer between the corresponding components. Conversely, rotational decoupling may include a state between two components when rotational energy is substantially inhibited from being transferred between the components.

A third gear 120 and a fourth gear 122 are additionally included on the intermediate shaft 118, although other gearing arrangements have been envisioned. Bearings 184 (e.g., tapered roller bearings) are coupled to either axial end of the intermediate shaft 118 to support the shaft and facilitate rotation thereof. The tapered roller bearings may decrease the axle package width when compared to other types of bearing such as ball bearings. However, other suitable intermediate shaft bearing types and/or arrangements have been envisioned. The bearing arrangement on the intermediate shaft as well as the other bearing arrangements described herein may be selected based on expected shaft loading (e.g., radial and thrust loading), gear size, shaft size, etc.

Continuing with the gear train description, the fourth gear 122 is rotationally coupled to a fifth gear 124 and the third gear 120 is rotationally coupled to a sixth gear 126. The first gear 114, the second gear 116, the third gear 120, the fourth gear 122, the fifth gear 124, and the sixth gear 126 are included in a gear assembly 130, in the illustrated embodiment. However, the gear assembly may include an alternate number of gears and/or have a different layout, in other embodiments. The number of gears in the assembly and the assembly layout may be selected based on end-use design goals related to desired gear range and packaging, for instance.

The first gear 114, the second gear 116, the fourth gear 122, and the fifth gear 124, may be included in a first gear set 127. Additionally, the first gear 114, the second gear 116, third gear 120, and the sixth gear 126, may be included in a second gear set 129. The first gear set 127 may have a higher gear ratio than the second gear set 129, in one example. However, other gear arrangements in the different gear sets may be used, in other examples. Clutch assemblies in the system 102 allow the first gear set 127 or the second gear set 129 to be placed in an operational state. To elaborate, the clutch assemblies allow the gear ratio delivered to drive wheels 128 on driving surfaces 133, by way of the gear assembly 130, a planetary gear assembly 138, and the differential 110, to be adjusted. For instance, the clutch assemblies may be operated to engage the first gear set 127, during certain conditions (e.g., towing, lower speed vehicle operation, etc.), and engage the second gear set 129, during other conditions (e.g., higher speed vehicle operation). As such, the system may transition between the different gear sets based on vehicle operating conditions, driver input, etc. In this way, the gear train has distinct selectable gear ratios, allowing the gear train to be adapted for different driving conditions, as desired. It will be appreciated that the gear ratio adjustability may also be utilized to increase electric motor efficiency, in some cases.

The system 102 may specifically include a first clutch assembly 132 and a second clutch assembly 134. The first clutch assembly 132 is configured to rotationally couple and decouple the fifth gear 124 from an output shaft 136. Likewise, the second clutch assembly 134 functions to rotationally couple and decouple the sixth gear 126 from the output shaft 136. The first clutch assembly 132 may include a one-way clutch 185 (e.g., sprag clutch) and a locking clutch 186 working in conjunction to accomplish the coupling/decoupling functionality, in a compact arrangement. The structure and function of the one-way and locking clutches are described in greater detail herein. The second clutch assembly 134 may be a wet friction clutch providing smooth engagement/disengagement, in one embodiment. However, in other examples, the second clutch assembly 134 may include additional or alternate types of suitable clutches (e.g., hydraulic, electromagnetic, etc.).

The output shaft 136 is rotationally coupled to the planetary gear assembly 138, in the illustrated embodiment. The planetary gear assembly 138 may include an annulus 187 also referred to as a ring gear, a carrier 188 with planet gears 189 mounted thereon, and a sun gear 190 providing a space efficient design capable of providing a relatively high gear ratio in comparison to non-planetary arrangements. In the illustrated embodiment, the sun gear 190 is rotationally coupled to the output shaft 136 and the carrier 188 is rotationally coupled to the differential 110 (e.g., a differential case). However, in alternate examples, different gears in the planetary assembly may be rotationally coupled to the output shaft and the differential. Further, in one example, the components of the planetary gear assembly 138 may be non-adjustable with regard to the components that are held stationary and allowed to rotate. Thus, in one use-case example, the annulus 187 may be held substantially stationary and the carrier 188, planet gears 189, and the sun gear 190 and the gears stationary/rotational state may remain unchanged during gear train operation. In the illustrated embodiment, the annulus 187 is fixedly coupled to the motor-generator housing, to increase system space efficiency. However, the annulus may be fixedly coupled to other vehicle structures, in other instances. By using a non-adjustable planetary assembly, gear train operation may be simplified when compared to planetary arrangements with gears having rotational state adjustability. However, adjustable planetary arrangements may be used in the system, in other embodiments.

Various bearings may be coupled to the output shaft 136 and the planetary gear assembly 138 to enable rotation of components coupled to the shaft and assembly and in some cases support the components with regard to radial and/or thrust loads. A bearing 191 (e.g., needle roller bearing) is shown coupled to the output shaft 136 and the second clutch assembly 134. Additionally, a bearing 192 (e.g., tapered roller bearing) is shown coupled to the second clutch assembly 134. A bearing 193 (e.g., floating bearing) is also shown coupled to the second clutch assembly 134 and the output shaft 136. A bearing 194 (e.g., thrust bearing) may also be positioned axially between and coupled to the sixth gear 126 and the first clutch assembly 132. A bearing 196 (e.g., fixed bearing) may also be coupled to the one-way clutch 185. Additionally, a bearing 197 (e.g., ball bearing) is shown coupled to the planetary gear assembly 138 and a bearing 198 (e.g., ball bearing) is shown coupled to the differential case 142. However, other suitable bearing arrangements have been contemplated, such as arrangements where the quantity and/or configurations of the bearings are varied.

Additionally, FIG. 1 depicts the planetary gear assembly 138 directly rotationally coupled to the differential 110. Directly coupling the planetary gear assembly to the differential increases system compactness and simplifies system architecture. In other examples, however, intermediate gearing may be provided between the planetary gear assembly and the differential. In turn, the differential 110 is designed to rotationally drive an axle 140 coupled to the drive wheels 128. The axle 140 is shown including a first shaft section 141 and a second shaft section 143 coupled to different drive wheels 128. Furthermore, the axle 140 is shown arranged within (e.g., co-axial with) the output shaft 136 which allows more space efficient design to be achieved. However, offset axle-output shaft arrangements may be used, in other examples.

Further in one example, the axle 140 may be a beam axle. A beam axle, also referred to in the art as a solid axle or rigid axle, may be an axle with mechanical components structurally supporting one another and extending between drive wheels coupled to the axle. Thus, wheels coupled to the axle may move in unison when articulating, during, for example, vehicle travel on uneven road surfaces. For instance, the beam axle may be a structurally continuous axle spanning the drive wheels on a lateral axis, in one embodiment. In another embodiment, the beam axle may include co-axial shafts receiving rotational input from different gears in the differential and structurally supported by the differential.

The differential 110 may include a case 142 housing gearing such as pinion gears, side gears, etc., to achieve the aforementioned energy transfer functionality. To elaborate, the differential 110 may be an electronic locking differential, in one example. In another example, the differential 110 may be an electronic limited slip differential or a torque vectoring dual clutch. In yet other examples, an open differential may be used. Referring to the locking differential example, when unlocked, the locking differential may allow the two drive wheels to spin at different speeds and conversely, when locked, the locking differential may force the drive wheels to rotate at the same speed. In this way, the gear train configuration can be adapted to increase traction, under certain driving conditions. In the case of the limited slip differential, the differential allows the deviation of the speed between shafts 144 coupled to the drive wheels 128 to be constrained. Consequently, traction under certain road conditions (e.g., low traction conditions such as icy conditions, wet conditions, muddy conditions, etc.) may be increased due to the wheel speed deviation constraint. Additionally, in the torque vectoring dual clutch example, the differential may allow for torque delivered to the drive wheels to be independently and more granularly adjusted to again increase traction during certain driving conditions. The torque vectoring dual clutch may therefore provide greater wheel speed/torque control but may, in some cases, be more complex than the locking or limited slip differentials.

The vehicle 100 may also include a control system 150 with a controller 152. The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may receive various signals from sensors 158 coupled various locations in the vehicle 100 and the electric drive axle system 102. The sensors may include a motor-generator speed sensor 160, an energy storage device temperature sensor 162, an energy storage device state of charge sensor 164, wheel speed sensors 166, clutch position sensors 168, etc. The controller 152 may also send control signals to various actuators 170 coupled at different locations in the vehicle 100 and the electric drive axle system 102. For instance, the controller 152 may send signals to the electric motor-generator 106 and the energy storage device 108 to adjust the rotational speed and/or direction (e.g., forward drive rotational direction and reverse drive rotational direction) of the motor-generator. The controller 152 may also send signals to the first clutch assembly 132 and the second clutch assembly 134 to adjust the operational gear ratio in the gear train 104. For instance, the first clutch assembly 132 may be disengaged and the second clutch assembly 134 may be engaged to place the second gear set 129 in an operational state (transferring rotational energy between the electric motor-generator 106 and the output shaft 136) or vice versa. Specifically, in one example, the controller may include instructions stored in the memory causing the controller to transition a locking clutch in the first clutch assembly into an engaged state in response to receiving a request to initiate a reverse or regeneration mode, for example. The other controllable components in the vehicle and gear system may function in a similar manner with regard to command signals and actuator adjustment. For instance, the differential 110 may receive command signals from the controller 152.

The vehicle 100 may also include an input device 172 (e.g., a gear selector such as a gear stick, gear lever, etc., brake pedal, accelerator pedal, console instrument panel, touch interface, touch panel, keyboard, combinations thereof, etc.). The input device 172, responsive to driver input, may generate a mode request indicating a desired operating mode for the gear train. For instance, in a use-case example, the driver may shift a gear selector into a gear mode (e.g., first gear mode or second gear mode) to generate a gear set modal transition request at the controller. In response, the controller commands gear train components (e.g., the first clutch assembly 132 and the second clutch assembly 134) to initiate a transition into a first gear mode, where the first gear set 127 is operational, from a second gear mode, where the second gear set 129 is operational, or vice versa. Other modality transitions have also been contemplated such as a modal transition into a forward drive mode from a reverse drive mode or vice versa responsive to driver input received from the input device 172. However, in other examples more automated gear train mode transitions may be implemented. For instance, the controller may automatically place the gear train in the first gear mode or the second gear mode based on vehicle speed and/or load, for example. The controller 152 may also be configured to transition the electric drive axle system 102 into a regenerative mode. In the regenerative mode, energy is extracted from the gear train using the electric motor-generator 106 and transferred to the energy storage device 108. For instance, the electric motor-generator 106 may be placed in a generator mode where at least a portion of the rotational energy transferred from the drive wheels to the generator by way of the gear train is converted into electrical energy. A variety of different modal control strategies have been contemplated. The power paths unfolding during the different system modes are discussed in greater detail herein with regard to FIGS. 20-22. In one example, the controller, responsive to receiving a request to reverse or regeneration mode transition, induces engagement of a locking clutch in the first clutch assembly 132.

FIG. 2 shows an electric drive axle system 200. It will be appreciated that the electric drive axle system 200, shown in FIG. 2, serves as an example of the electric drive axle system 102 shown in FIG. 1. As such, at least a portion of the functional and structural features of the electric drive axle system 102 shown in FIG. 1 may be embodied in the electric drive axle system 200 shown in FIG. 2 or vice versa, in certain examples.

The electric drive axle system 200 again includes an electric motor-generator 202 and a gear train 204. The electric motor-generator 202 has an electrical interface 206 which is illustrated as a bus bar in FIG. 2. However, other suitable electrical interfaces may be used, in other examples. The electric motor-generator 202 further includes a housing 208. The gear train 204 may include an input shaft 210, an intermediate shaft 212, and an output shaft 214. The input shaft 210 receives rotational input (forward or reverse drive rotation) from the electric motor-generator 202, while the system is operating in forward and reverse drive modes. Different gears in a gear train 204 are coupled to the different shafts, expanded upon in greater detail herein with regard to FIG. 3. Rotational axes 216, 218, and 220 of the input shaft 210, the intermediate shaft 212, and the output shaft 214 are provided for reference in FIG. 2 and FIGS. 3-18 and 20-23, when applicable. FIG. 2 additionally shows a planetary gear assembly 222 rotationally coupled a differential 224 in the gear train 204. It will be appreciated that placing the planetary gear assembly 222 next to the differential 224 allows less torque to be carried through the gear train 204, enabling the drive train to have fewer and/or smaller components, if wanted.

The planetary gear assembly 222 can achieve a targeted gear ratio (e.g., a relatively high gear ratio, such as a ratio greater than 20:1) in a compact arrangement relative to non-planetary gear arrangements. Thus, the planetary gear assembly can achieve a desired gear ratio with less components (e.g., gears and shafts) than non-planetary gear assemblies, if desired. Furthermore, in embodiments where the planetary gear assembly exhibits a relatively high torque output, the planetary assembly can attain a more compact packaging due to the load sharing between the planet gears, if desired. Axis system 250 is illustrated in FIG. 2 as well as FIGS. 3-18 and 20-23, when appropriate, for reference. The z-axis may be a vertical axis, the x-axis may be a lateral axis, and/or the y-axis may be a longitudinal axis, in one example. However, the axes may have other orientations, in other examples.

FIG. 3 shows the electric drive axle system 200 with the electric motor-generator 202, input shaft 210, intermediate shaft 212, output shaft 214, and gear train 204. The gear train 204 may include a first gear 300 coupled to the input shaft 210. As described herein, the descriptor "coupled to" may indicate one component is structurally coupled to or formed with another component. For instance, the first gear 300 may be machined from a flange on the input shaft 210, in one example, or separately manufactured and subsequently mechanically attached (e.g., welded, bolted, press-fit, etc.) to the input shaft 210.

A second gear 302 is coupled to the intermediate shaft 212. A third gear 304 and a fourth gear 306 are also coupled to the intermediate shaft 212. Additionally, a fifth gear 308 and a sixth gear 310 are coupled to the output shaft 214. It will be understood, that during different modes of system operation different sets of gears may be operational. To elaborate, the first gear 300, the second gear 302, the fourth gear 306, and the fifth gear 308 may be included in a first gear set 312. On the other hand, the first gear 300, the second gear 302, the third gear 304, and the sixth gear 310 may be included in a second gear set 314. A park gear 311 may also be included in the gear train 204, in some examples. However, the gear sets may include different gear combinations, in other examples. It will be understood that the first and the second gear sets 312 and 314 have different gear ratios. In this way, the gear train may include multiple gear ratios to increase gear train adaptability. Additionally, the gear sets may share a few common gears (i.e., the first and second gears in the illustrated embodiment). Fixing the first ratio (i.e., the first and second gears) in the gear train can allow the accuracy of the gears to be increased, if wanted, thereby reducing NVH in the axle system. However, embodiments where the gear sets do not include overlapping gears have been envisioned. Clutches, described in greater detail herein, are included in the gear train 204 to enable the first gear set 312 and the second gear set 314 to be coupled/decoupled to/from the output shaft 214. In this way, the different gear sets may be operationally selected to, for example, more aptly suite the driving environment and/or increase electric motor efficiency. Thus, the first and second gear sets 312 and 314 may be conceptually included in a selectable gear assembly 316. A cutting plane A-A' indicating the cross-sectional view of FIG. 8 is provided in FIG. 3.

The planetary gear assembly 222 is shown in FIG. 3 rotationally coupled to the output shaft 214. FIG. 3 additionally illustrates the differential 224 in the gear train 204 rotationally coupled to the planetary gear assembly 222. However, gear trains with gears positioned between the planetary assembly and the differential have been contemplated. It will be appreciated that in some embodiments, the gear ratio corresponding to the planetary gear assembly 222 may be greater than the gear ratio corresponding to the first gear set 312 or the second gear set 314. The planetary gear assembly 222 allows a desired gear ratio to be realized in a compact arrangement. For instance, the planetary gear assembly 222 may achieve a relatively high gear ratio and space efficiency, if desired. However, non-planetary gear arrangements may be used, in other examples. Furthermore, the planetary gear assembly 222 and the differential 224 are shown positioned on a lateral side 322 of a housing 208 the electric motor-generator 202. A lateral axis 324 of the motor-generator is provided for reference. Offsetting the output shaft 214 and the intermediate shaft 212 from the input shaft 210 allows the planetary gear assembly 222 to be positioned on the side 322 of the motor-generator. It will be appreciated that the planetary gear assembly may be located adjacent to the motor's lateral side 322 due to the planetary gear assembly's ability to be integrated into the gear train without a mating gear parallel thereto, if wanted. In this way, the planetary gear assembly may be placed in a spaced which has remained unused in certain electrified gearboxes. Thus, positioning the planetary gear assembly on the side of the motor allows the compactness of the axle system to be increased. As a result, packaging constraints arising during axle installation in the vehicle may pose less of an issue. However, in other examples, the planetary gear assembly 222 may be positioned in other suitable locations. For instance, the planetary gear assembly may be coupled to a section of the output shaft extending away from the motor-generator.

FIG. 4 shows a side view of the electric drive axle system 200 with the input shaft 210, intermediate shaft 212, and the output shaft 214. A cutting plane B-B' indicating the cross-sectional view of FIG. 5, a cutting plane C-C' indicating the cross-sectional view of FIG. 6, and a cutting plane D-D' indicating the cross-sectional view of FIG. 7 are illustrated in FIG. 4.

FIG. 5 shows a cross-section view of the electric motor-generator 202 and input shaft 210 in the electric drive axle system 200. The input shaft 210 is shown transition fit with a rotor shaft 500. However, other suitable coupling techniques have been contemplated, such as press fitting, welding, splined engagement, etc. The rotor shaft 500 is coupled to a rotor 501 designed to electromagnetically interact with a stator 503 to generate forward drive rotational output, reverse drive rotational output, and/or generate electrical energy during a regeneration mode.

A first bearing 502 and a second bearing 504 are shown coupled to the input shaft 210 with the first gear 300 thereon. The bearings 502 and 504 are positioned on opposing axial sides of the first gear 300, to for example reduce shaft bending moments. However, other bearing arrangements have been envisioned such as a bearing arrangement with one or two bearings on an outboard side of the first gear 300. As described herein, a bearing is a component designed to enable rotation of the component(s) to which it is attached and therefore may include rolling elements (balls, cylindrical rollers, tapered cylindrical rollers, etc.), races (e.g., inner and outer races), etc., to enable the rotational functionality to be achieved. In one specific example, the first bearing 502 may be a floating bearing and/or may be coupled to the input shaft 210 via a slip fit spline 506. In another specific example, the second bearing 504 may be a fixed bearing. However, other suitable bearing configurations may be used, in other examples, such as an arrangement where both of the bearings are fixed bearings, for instance.

Turning to FIG. 6, where the input shaft 210 and the first gear 300 are shown rotationally attached to the second gear 302 in the intermediate shaft 212 of the gear train 204 of the electric drive axle system 200. Therefore, during gear train operation, torque is transferred between the first gear 300 and the second gear 302. The third gear 304 and the fourth gear 306 attached to the intermediate shaft 212 are also depicted in FIG. 6. However, other gearings arrangements may be used, in other examples. Bearings 600 are shown positioned on opposing axial sides 602 of the intermediate shaft 212. The bearings 600 are specifically illustrated as tapered roller bearings. However, other types of bearings and/or bearing arrangements may be used for the intermediate shaft, in other examples.

FIG. 7 shows a detailed cross-sectional view of the intermediate shaft 212 and the output shaft 214 included in the electric drive axle system 200. The sixth gear 310 is shown coupled to the output shaft 214. The fifth gear 308 is arranged on a bearing 700 on the output shaft 214. The planetary gear assembly 222 and the differential 224 are also shown in FIG. 7. The differential 224 is depicted as a bevel gear differential, in FIG. 7, discussed in greater detail herein. However, planetary gear, spur, or helical gear differentials may be used, in other embodiments.

Referring to FIG. 8 showing a more detailed view of the output shaft 214 and corresponding components in the gear train 204 of the electric drive axle system 200. Specifically, the fifth gear 308, the sixth gear 310, the planetary gear assembly 222, and the differential 224 are again depicted. The electric drive axle system 200 includes clutches allowing the gear ratio in the gear train 204 delivered to the planetary gear assembly 222 to be adjusted. Specifically, a first clutch assembly 800 is configured to rotationally couple and decouple the fifth gear 308 to/from the output shaft 214 and a second clutch assembly 802 is configured to rotationally couple and decouple the sixth gear 310 to/from the output shaft.

FIG. 9 shows a detailed view of the first clutch assembly 800 configured to rotationally couple/decouple the fifth gear 308 to/from the output shaft 214. To elaborate, the first clutch assembly 800 includes a locking clutch 900 and a one-way clutch 902, in the illustrated example. The one-way clutch 902 is designed to freely rotate about the output shaft 214 when receiving rotational input in a first direction (reverse drive rotational direction) from the fifth gear 308 or when it is overrun via the output shaft. The one-way clutch 902 is also configured to transfer torque to the output shaft 214 when receiving rotational input in a second direction (e.g., front drive rotational direction) from the fifth gear 308. The one-way clutch 902 may be a sprag clutch, in one example. However, other suitable types of one-way clutches may be used in other examples, such as ratcheting clutches. Additionally, a section 903 of the output shaft 214 below the one-way clutch 902 may be locally thicker due to the contact stress and deflection of shaft along the one-way clutch, in one example. Further, in some examples, snap rings 905 may be used to axially retain the one-way clutch 902 and/or the bearing 700.

An embodiment of a one-way clutch is shown in FIG. 23. The sprag clutch 2300 includes a plurality of sprag mechanisms 2302 mounted on carrier rings 2304. The sprag mechanisms 2302 may be spring loaded and rotate about axis 2306. The sprag mechanisms 2302 include curved surfaces 2308 having asymmetric profiles. When the fifth gear (e.g., fifth gear 308, shown in FIG. 9) attached to the sprag clutch rotates in the forward drive direction, at a speed greater than the output shaft (e.g., output shaft 214 shown in FIG. 9), the curved surfaces 2308 frictionally engage an outer surface of the output shaft and an inner surface of the fifth gear to allow the fifth gear and the output shaft to rotate in unison. Contrariwise, when the fifth gear is rotated in the reverse drive direction or the output shaft speed exceeds the gear speed, the curved surfaces 2308 in the sprag mechanisms 2302 disengage and allow the fifth gear 308, shown in FIG. 9, to freewheel with regard to the output shaft 214, shown in FIG. 9, referred to herein as a freewheel configuration. The sprag clutch allows for quick and robust engagement between the clutch and the shaft when transitioning from the freewheel configuration to the engaged configuration. The sprag clutch may also have less drag in the freewheel configuration when compared to other types of one-way clutches, such as one-way clutches including ratcheting mechanisms.

The locking clutch 900, illustrated in FIG. 9, is designed to rotationally couple and decouple the fifth gear 308 from the output shaft 214. To elaborate, the locking clutch 900 may be a dog clutch with teeth 904 on an axially adjustable shift collar 906 designed to mate with teeth 908 in the fifth gear 308 when engaged. Conversely, when the dog clutch is disengaged the teeth 904 on the shift collar 906 may be spaced away from the teeth 908 on the fifth gear 308. The teeth 908 are shown positioned radially inward from gear teeth 909 on the fifth gear 308. However, other arrangements of the clutch teeth on the fifth gear may be used, in other examples. The bearing 700 (e.g., needle roller bearing) coupled to the fifth gear 308 is also shown in FIG. 9. It will be appreciated that the bearing 700 may pilot the one-way clutch 902.

The shift collar 906 may be rotationally attached to the output shaft 214 by way of an indexing shaft 910. Furthermore, the indexing shaft 910 may be attached to the output shaft via press-fitting, a splined interface, combinations thereof, etc. The indexing shaft 910 may therefore be fixedly coupled to the output shaft 214 and co-rotate therewith during gear train operation. Although, in the illustrated embodiment, the shift collar 906 is designed to axially translate along the indexing shaft 910 during locking clutch engagement and disengagement, it will be understood that locking clutch (e.g., dog clutch) embodiments where the clutch is configured for radially translation during actuation have been envisioned. In such an example, the clutch's sleeve may be a radially translating sleeve with involute or straight teeth.

An actuator 911 (e.g., shift fork) is shown in FIG. 9 coupled to the locking clutch 900. Various types of actuators have been envisioned such as an electromagnetic actuator (e.g., a solenoid), a hydraulic actuator, a pneumatic actuator, combinations thereof, etc. Thus, the actuator 911 may be designed to place the shift collar 906 in an engaged configuration where teeth 904 are mated with the teeth 908 in the fifth gear 308. Furthermore, the locking clutch 900 is designed with self-indexing functionality to provide smoother clutch engagement. To elaborate, the clutch may be designed with features for reducing the chance of (e.g., avoiding) clutch teeth misalignment. As a result, clutch NVH caused by clutch teeth misalignment is reduced and the likelihood of a blocked condition impeding clutch engagement is significantly reduced (e.g., avoided). To achieve the self-indexing clutch engagement the clutch includes tapered teeth and an indexing mechanism allowing the teeth to land in a desired mated position when transitioning into an engaged (e.g., "locked") configuration. These features are discussed in greater detail herein with regard to FIGS. 10-18.

A thrust bearing 912 (e.g., needle roller thrust bearing) is also shown positioned at an interface between the indexing shaft 910 and the fifth gear 308 to enable a desired spacing to be maintained between the components while allowing rotation therebetween. Additionally, the thrust bearing 912 may be preloaded via a spring 914 (e.g., a wave spring, helical spring, elastomeric spring, etc.). However, other suitable gear train arrangements may be used in other examples such as gear trains where the spring 914 and/or thrust bearing 912 are omitted. A bearing 916 (e.g., a fixed bearing) is also shown attached to an extension 918 (e.g., axial extension) of the fifth gear 308 interfacing with the one-way clutch 902. However, in other examples the bearing 916 may be omitted from the gear train. The bearing 916 is specifically depicted as a ball bearing. The ball bearing may be used in the system, due to cost and packaging. However, the bearing 916 may be a spherical roller bearing, a tapered roller bearing, four point contact bearing, etc., in other embodiments. In one example, the bearing 916 may be fixed on both sides to allow the spring 914 to apply a preload to the thrust bearing 912 and the sixth gear 310. The one-way clutch 902 is also shown positioned between the extension 918 of the fifth gear 308 and an outer surface 919 of the output shaft 214. However, alternate locations of the one-way clutch have been contemplated.

The second clutch assembly 802 is depicted in FIG. 9 as a wet friction clutch. Using a wet friction clutch enables load transfer in both forward and reverse directions, allowing the drive train to forego a locking clutch in the second clutch assembly, in some instances. However, alternate types of clutches such as hydraulic clutches, electromagnetic clutches, and the like may be deployed, in other arrangements. The wet friction clutch includes friction plates 920 engaging one another when the clutch is activated to transfer torque from the sixth gear 310 to the output shaft 214. Likewise, when the wet friction clutch is disengaged, the friction plates 920 are frictionally decoupled and torque transfer from the sixth gear 310 to the output shaft 214 is inhibited. To elaborate, a first set of friction plates 921 are coupled to the sixth gear 310 and a second set of friction plates 923 are coupled to the output shaft 214 to enable coupling/decoupling action in the clutch.

Various bearings may enable the wet friction clutch to be rotated as well as provide axial and radial support to the clutch. The bearing corresponding to the wet friction clutch may include for example, a pilot bearing 922 (e.g., floating pilot bearing), a roller bearing 924 (e.g., needle roller bearing, a thrust bearing 926 (e.g., needle roller thrust bearing), and a roller bearing 928. However, other suitable bearing arrangements providing a desired amount of radial and axial support to the wet friction clutch and output shaft for the wet friction clutch have been contemplated.

The second clutch assembly 802 (e.g., friction clutch) and the locking clutch 900 may be adjusted via commands from a controller, such as the controller 152 shown in FIG. 1, to induce engagement or disengagement of each clutch. As such, the gear train's gear ratio may be adjusted as desired based on vehicle operating conditions, driver input, etc.

Referring again to FIG. 8, showing the planetary gear assembly 222 rotationally coupled to the output shaft 214. FIG. 8 also illustrates the planetary gear assembly 222 with a sun gear 810 rotationally coupled to output shaft 214. The sun gear 810 is rotationally coupled to planet gears 812 residing on planet pins 814 on a carrier 816. In turn, the carrier 816 is shown coupled to the differential 224. However, planetary arrangements with other components (e.g., carrier or annulus) coupled to the output shaft 214 and other components (e.g., sun gear or annulus) coupled to the differential 224, have been envisioned. The planetary gear assembly 222 also includes an annulus 818 rotationally interacting with the planet gears 812. Bearings 820 (e.g., needle roller bearings) arranged between the planet pins 814 and the planet gears 812 may allow the planet gears to rotate. A thrust bearing 822 (e.g., needle roller thrust bearing) may also be coupled to the sun gear 810 to enable rotation thereof and provide axial support thereto.

The annulus 818 may be held fixed to enable the planetary gear assembly 222 to achieve a relatively high gear ratio. Thus, the annulus 818 may include suitable features such as a spline 828 to enable the position of the annulus to be fixed. However, planetary gear arrangements where alternate components are held fixed and alternate components are allowed to rotate may be utilized, in other examples. For instance, the annulus may be allowed to freely rotate and the carrier may be held stationary, in one example, or the sun gear may be held stationary and the carrier and the annulus may be allowed to rotate, in other examples. In one embodiment, the components in the planetary gear assembly that are allowed to rotate and held stationary may not be adjustable. To elaborate, the components in the planetary gear assembly that are allowed to rotate and held substantially stationary may remain in the same state (a substantially fixed state or a rotational state) during gear train operation, in some embodiments. The planetary gear assembly can therefore achieve even greater space efficiency, in such an embodiment. In other embodiments, planetary components whose fixed/rotational state can be adjusted during gear train operation have also been contemplated. Thrust washers and/or bushings 830 may also be positioned on opposing axial sides of the planet gears 812 to provide planet gear spacing and support functionality.

A clutch assembly 832 configured to lock and unlock the differential 224 may also be included in the gear train 204. The clutch assembly 832 may, in one example, include a locking clutch 834 (e.g., dog clutch) configured to operate in a locked and unlocked configuration. In the locked configuration the locking clutch 834 causes the side gears 836 to rotate in unison. Conversely, in the unlocked configuration, the locking clutch 834 allows the side gears 836 to have rotational speed variance. One of the gears 836 may therefore include teeth 837 mating/disengaging with/from teeth 839 in the locking clutch 834. The clutch assembly 832 may further include an electronic actuator 835 (e.g., solenoid) inducing engagement and disengagement of the clutch assembly 832.

FIG. 8 also shows the differential 224 rotationally coupled to an axle 838. Specifically, the side gears 836 may be rotationally attached to axle 838. The axle 838 is shown including a first shaft section 840 which may be coupled to a first drive wheel and a second shaft section 842 which may be coupled to a second drive wheel. However, in other examples, a continuous shaft may extend through the differential or the shaft may be partitioned into additional sections. The axle 838 may be a beam axle, enabling the load carrying capacity and the durability of the axle to be increased, if wanted. However, non-rigid axle designs may be utilized, in other cases. Additionally, the axle 838 is positioned within an interior opening 841 of the output shaft 214 and is positioned co-axial therewith, to increase system compactness. However, off-axis axle-output shaft layouts may be used, in some instances. A bearing 846 is also shown coupled to a case 848 of the differential 224. Additionally, a bearing 849 is shown coupled to the planetary gear assembly 222 (e.g., the carrier 816). However, the bearing 849 may be omitted or placed in another suitable location, in other embodiments.

The case 848 is rotationally coupled to the carrier 816. In turn, the case 848 is rotationally coupled to internal differential gearings. FIG. 8 specifically shows the differential 224 embodied as a locking type differential (e.g., electronic locking differential). However, as previously discussed, alternate types of differentials have been contemplated such limited slip differentials (e.g., electronic limited slip differentials), differentials with a torque vectoring dual clutch, open differentials, etc. In the case of an open differential, the differential may share a common case with the planetary gear assembly and the case may be sized and profiled to enable differential gear installation. Furthermore, the differential 224 depicted in FIG. 8 includes bevel gears 860 attached via a bevel gear shaft 862. Additionally, in the illustrated embodiment, the bevel gears 860 are rotationally coupled to the side gears 836. However, planetary, spur, and helical gear type differentials may be used, in other examples.

FIGS. 10-12 show a sequence of engagement in a locking clutch 1000. The locking clutch 1000 is an example of the locking clutch 900, shown in FIG. 9. As such, the locking clutch 1000 may be included in the electric drive axle system 200, shown in FIGS. 2-9 and include previously described structural and/or functional features of various components in the system.

The locking clutch 1000 includes a toothed face 1002 on a gear 1004 (e.g., fifth gear 308, shown in FIGS. 2-9) and a toothed face 1006 on a shift collar 1008. To elaborate, the toothed face 1002 extends (e.g., axially extends) from gear body 1010 and the toothed face extends (e.g., axially extends) from a sleeve body 1012. The shift collar 1008 may, in one embodiment, be designed to axially translate along an indexing shaft (e.g., indexing shaft 910, shown in FIG. 9) during clutch actuation. However, in other embodiments, the shift collar 1008 may be configured to radially translate in relation to the indexing shaft during engagement/disengagement action. Splines or other suitable geometric features may be included in the shift collar and the gear to allow for translation (e.g., radial or axial translation) therebetween. As previously discussed, the indexing shaft may be coupled to the output shaft (e.g., output shaft 214) such that they co-rotate.

The toothed face 1006 of the gear includes a plurality of teeth 1014. Each of the plurality of teeth 1014 is tapered at an end 1016 (e.g., distal end). Correspondingly, the toothed face 1006 of the shift collar includes a plurality of teeth 1018 with each tooth being tapered at an end 1020 (e.g., distal end). Although each of the teeth in the toothed faces 1002 and 1006 are shown having tapered ends, it will be appreciated that in other embodiments only a portion of the plurality of teeth may be tapered. For instance, in one use-case scenario, one tooth in the gear and one tooth in the shift collar may be tapered. Tapering the teeth in the clutch, during clutch engagement, induces relative motion (e.g., rotational motion) between the shift collar 1008 and the indexing shaft as a result of the actuating motion (e.g., axial motion of the shift sleeve and the indexing mechanism, discussed in greater detail herein with regard to FIG. 13-15).

The ends 1016 of the teeth 1014 in the gear 1004 taper at an angle 1022 and the ends 1020 of the teeth 1018 in the shift collar 1008 taper at an angle 1024. The angle 1022 may be measured from a surface 1026 of the end 1016 of the tooth 1014 and a radially aligned plane with regard to the axis of rotation (e.g., axis 220, shown in FIG. 9) of the gear 1004. Likewise, the angle 1024 may be measured from a surface 1028 of the end 1020 of the tooth 1018 and a radially aligned plane with regard to the axis of rotation of the shift collar 1008. As such, the surfaces 1026 and 1028 of the teeth 1014 and 1018 may be planar in one example. However, in other examples, at least a portion of the surfaces of the teeth may be curved.

The angles 1022 and 1024 may be selected based on various parameters, such as the actuator force imparted to the shift collar via the locking clutch actuator (e.g., shift fork) and/or the spring force of an indexing mechanism in the locking clutch, for example. In one use-case example, the angle 1022 and/or the angle 1024 may be greater than 5°. In another use-case example, the angle 1022 and/or the angle 1024 may be between 20° and 40°. However, numerous suitable angles and angle ranges have been contemplated. It will also be appreciated that the angle 1022 and the angle 1024 may be substantially equivalent, in some embodiments, to allow the teeth to smoothly engage and induce shift collar indexing. However, in other examples, the angle 1022 may not be substantially equivalent to the angle 1024.

FIG. 10 specifically depicts the toothed face 1002 in the gear 1004 and the toothed face 1006 in the shift collar 1008 in a blocked condition where the ends of the teeth in the gear and the shift collar are aligned (e.g., substantially aligned along axes 1025) such that they are impeding the gear and collar from mating. It will be appreciated that there may be no relative motion between the indexing shaft and the gear 1004 when the one-way clutch (e.g., the one-way clutch 902, shown in FIG. 9) coupled to the output shaft (e.g., output shaft 214, shown in FIG. 9) is engaged. Therefore, if the one-way clutch is engaged when the teeth of the locking clutch (toothed face 1002 and toothed face 1006) are in a blocked condition, as illustrated in FIG. 10, indexing of the shift collar may be needed to enable clutch engagement. As such, the locking clutch includes an indexing mechanism allowing for relative motion between the shift collar and the indexing shaft during clutch engagement. The indexing mechanism is described in greater detail herein with regard to FIGS. 13-16 and 18.

However, as shown in FIG. 11, due to the tapered profiles of the teeth in the toothed face 1002 and the toothed face 1006 as well as an indexing mechanism, the teeth 1018 in the shift collar 1008 are allowed to move (e.g., rotate such that their radial position is altered) with regard the teeth 1014 in the gear 1004. As a result, the teeth 1018 in the shift collar 1008 and the teeth 1014 in the gear 1004 slide toward a mated position where the teeth are in a targeted engagement position. Specifically, the surface 1028 of the tooth 1014 slides along the surface 1026 of the tooth 1014.

FIG. 12 shows the locking clutch 1000 in an engaged configuration where the teeth 1014 in the gear 1004 and the teeth 1018 in the shift collar 1008. When engaged, the ends 1016 of the teeth 1014 are adjacent to (e.g., abut) a face 1200 in a clutch recess 1202 of the shift collar 1008. Conversely, during engagement the ends 1020 of the teeth 1018 are adjacent to (e.g., abut) a face 1204 in a clutch recess 1206 in the gear 1004. In this way, the teeth in the locking clutch 1000 are allowed to smoothly land in a desired mated position. Consequently, the NVH occurring during clutch engagement is reduced and the chance of tooth misalignment occurring during clutch engagement is decreased. It will be appreciated that the gear 1004 and the shift collar 1008 may be constructed out of a metal such as steel, iron, aluminum, combinations thereof, etc. in one example.

FIG. 13 shows an example of an indexing shaft 1300 in the locking clutch 1000 as well as another section of the shift collar 1008. The indexing shaft 1300 includes a spline 1302 with teeth 1304 coupled to a spline 1306 with teeth 1308 in the shift collar 1008. An indexing mechanism 1310 is shown in FIG. 13 including a spring loaded ball 1312. The spring loaded ball 1312 interfaces with a ramp 1314 in the spline 1306 of the shift collar 1008. The spring loaded ball 1312 is designed to retract into the indexing shaft 1300 during clutch engagement to allow the shift collar 1008 to index with regard to the indexing shaft 1300. In turn, when the shift collar indexes, teeth 1018 in the shift collar 1008 can land in a desired position to seamlessly mate with teeth 1014 in the gear 1004, as shown in FIG. 12.

FIG. 14 shows a detailed view of the indexing shaft 1300 with the spline 1302 having the teeth 1304. The indexing mechanism 1310 is again shown. The indexing mechanism 1310 is specifically illustrated including two spring loaded balls 1312 which are axially aligned along the shaft. However, indexing mechanisms with an alternate number and/or arrangement of spring loaded balls have been envisioned. For instance, the balls, in another embodiment, may be positioned side by side by side such that they have a similar axial position but different radial positions. Further still in another embodiment, additional balls may be included in the indexing mechanism, such as balls arranged at different radial positions (e.g., symmetric radial positions) on the indexing mechanism. The spring loading of the balls may be selected, in one example, to prevent self-indexing resulting from inertial load during gear train operation but allow for indexing during clutch engagement. In this way, the indexing mechanism allows the shift collar to index when needed and inhibits indexing during other gear train operating conditions. The material construction, shape, and/or size of the springs may be selected to achieve a desired spring rate.

FIG. 14 also shows a park gear 1400 arranged on the indexing shaft 1300. However, it will be appreciated that in other examples, the park gear may be omitted from the indexing shaft.

FIG. 15 shows a cross-sectional view of the indexing mechanism 1310 in the locking clutch 1000. The shift collar 1008 and the indexing shaft 1300 are again illustrated. Additionally, the ball 1312 and a spring 1500 positioned in a recess 1502 of the indexing shaft 1300 are also illustrated. It will be understood that the spring 1500 is configured to exert an outward radial force on the ball 1312. The spring 1500 may be a helical spring, a wave spring, an elastomeric spring, combinations thereof, etc. It will be appreciated that the ball 1312 may retract at least partially into the recess 1502 during indexing. As such, the diameter 1504 of the recess 1502 may be larger than the diameter 1506 of the ball 1312. Furthermore, the ball 1312 is shown interacting with the ramp 1314 in the shift collar 1008 to maintain the shift collar 1008 in a non-indexed position with regard to the indexing shaft 1300.

FIG. 15 additionally illustrates the spline 1306 in the shift collar 1008 mated with the spline 1302 (e.g., torque carrying member) in the indexing shaft 1300 via teeth 1304 and 1308. However, the specific profile of the spline 1302 (e.g., torque carrying member) in the indexing shaft may take a variety of forms. For instance, spline 1302 may have an involute shape, a tab shape, a pin shape, a tongue and groove shape, etc. Regardless of the specific shape of the splines, the splines 1302 and 1306 are profiled with backlash 1508 therebetween. Backlash indicates a gap between sequential teeth in an interface. In this way, the relative radial position of the indexing shaft 1300 and the shift collar 1008 may be changed during certain conditions. Put another way, the splines may be profiled to achieve rotational compliance and allow for indexing between the indexing shaft 1300 and the shift collar 1008. The amount of backlash between the teeth of the splines may be selected to enable the shift collar teeth in the clutch to rotate by a desired degree such that the teeth shift from a blocked position to a mated position during clutch engagement.

The ball 1312 is shown mated with the ramp 1314 where the backlash 1508 is at or near a larger value (e.g., maximum value). However, when an axial load on the clutch teeth 1014 and 1018, shown in FIG. 10, exerted via an actuator (e.g., actuator 911, shown in FIG. 9) such as a shift fork, exceeds the spring force of the spring 1500 coupled to the ball 1312, the shift collar 1008 indexes with regard to the indexing shaft 1300. FIG. 15 also shows an interior spline 1510 that may be configured to mate with a spline in an output shaft (e.g., output shaft 214, shown in FIG. 9). Thus, the indexing shaft 1300 co-rotates with the output shaft.

FIG. 16 shows another cross-sectional view of the indexing shaft 1300 and the shift collar 1008 in the locking clutch 1000. It will be appreciated that the cross-section shown in FIG. 16 is viewed from an opposite axial side of the shaft and collar arrangement in comparison to the cross-sectional view, shown in FIG. 15.

Continuing with FIG. 16, an arrangement between the indexing shaft 1300 and the shift collar 1008 where the backlash 1508 is decreased to allow the teeth 1014 and 1018 shown in FIG. 10, in the locking clutch 1000 to land in a mated position, is illustrated. In other words, the distance between sequential mated spline surfaces is decreased to enable the indexing shaft and shift collar arrangement to gain compliance for a smooth landing between faces in the clutch. To gain the compliance, the ramp 1314 in the indexing mechanism 1310 pushes the ball 1312 at least partially into the recess 1502, thereby compression the spring 1500.

FIG. 17 shows another example of a gear 1700 and a shift collar 1702 in a locking clutch 1704. It will be understood that the gear 1700 and shift collar 1702 may be examples of the fifth gear 308 and the shift collar 906, shown in FIG. 9, and therefore may be included in the gear train 204, shown in FIGS. 2-9. Again, the gear 1700 includes a body 1706 with a plurality of teeth 1708 extending therefrom and the shift collar 1702 includes a body 1710 with a plurality of teeth 1712 extending therefrom. The teeth 1708 in the gear 1700 are again tapered at their ends 1714 (e.g., distal ends). Likewise, the teeth 1712 in the shift collar 1702 are also tapered at their ends 1716. However, the teeth 1708 include two tapered surfaces 1718 and 1720. To elaborate, for each tooth the tapered surfaces are shown converging at apexes 1722. However, in other examples, the ends of the teeth may have a flat (e.g., blunt surface) or curved surfaced at their convergence. Additionally, the tapered surfaces 1718 and 1720 are shown arranged at a similar angle 1724 with regard to a radial plane. However, embodiments where the surfaces have different angles have been contemplated. The teeth 1712 also include two tapered surfaces 1728 and 1730 converging at an apex 1732. The angles 1734 of the tapered surfaces 1728 and 1730 may be similar (e.g., substantially equivalent) to the angles 1724. Furthermore, the teeth in the gear and shift collar shown in FIG. 17 are in a blocked condition where the apexes 1722 and 1732 of the teeth are axially aligned with one another.

FIG. 18 shows an indexing mechanism 1800 included in the shift collar 1702 and an indexing shaft 1802 of the locking clutch 1704. The indexing mechanism 1800 shown in FIG. 18 again includes a ball 1804 and a spring 1806 housed in a recess 1808. The indexing mechanism 1800 also includes a bi-directional ramp 1810 with two angled surfaces 1812 converging at an apex 1814. The ball 1804 is shown aligned with the apex 1814 in FIG. 18. However, when the shift collar 1702 is axial loaded, during clutch engagement, and the resulting radial load from the tapered teeth exceeds the spring force on the ball 1804, the shift collar 1702 indexes in either direction 1816 or direction 1818. In this way, the indexing mechanism 1800 may function as an over-center device.

FIG. 19 shows a method 1900 for operation of an electric drive axle system. The method 1900 may be implemented by one or more of the electric drive axle systems, components, etc., described above with regard to FIGS. 1-18, in one embodiment, or may be implemented by another suitable electric drive axle, in other embodiments. Furthermore, the method 1900 may be implemented by a controller including a process and memory, as previously discussed.

At 1902, the method includes determining operating conditions. The operating conditions may include a locking clutch position, friction clutch position, brake pedal position, accelerator pedal positon, one-way clutch state, vehicle speed, vehicle load, motor-generator temperature, motor-generator output speed, battery state of charge, etc.

Next at 1904, the method includes determining whether to engage the locking clutch. Such a determination may take into account the operating conditions. For instance, in one use-case example, it may be determined that locking clutch engagement is desired responsive to receiving a reverse gear shift request generated via a gear selector or other suitable input device. In other examples, the vehicle controller may determine the vehicle is slated to operate in a regeneration mode responsive to brake pedal actuation or accelerator pedal release, for example.

If it is determined that the locking clutch should not be engaged (NO at 1904), the method proceeds to 1906, where the method includes maintaining locking clutch disengagement.

Conversely, if it is determined that the locking clutch should be engaged (YES at 1904) the method advances to 1908 where the method includes transitioning the locking clutch into an engaged state. It will be appreciated, that in one example, the one-way clutch may be engaged when the locking clutch transitions into an engaged state. In this example, the relative position between the indexing shaft and the fifth gear may remain substantially fixed. Therefore, if after one-way clutch engagement, the tapered clutch teeth in the shift collar and the gear are in a blocked or partially blocked position they may remain blocked until the locking clutch transitions into a locked state. As such, during locking clutch engagement, if the clutch teeth are in a blocked or partially blocked state, the tapered ends of the teeth and the indexing mechanism in the locking clutch work in conjunction to smoothly transition the gear teeth into the locked state.

FIGS. 20-22 show the gear train 204 operating in different modes. As such, the gear train 204 may be placed in different operational modes via a controller, such as the controller 152, shown in FIG. 1. The modes may include a first gear mode where the first gear set 312, shown in FIG. 3, transfers rotational energy between the electric motor-generator 202 and the planetary gear assembly 222. The modes may also include a second gear mode where the second gear set 314, shown in FIG. 3, transfers rotational energy between the electric motor-generator 202 to the planetary gear assembly 222. The modalities may also be partitioned based on a reverse and forward drive motor arrangement. To elaborate, the electric motor-generator 202 may produce rotational output in a first direction corresponding to forward drive and may produce rotational output in a second direction opposing the first corresponding to reverse drive. As such, the gear train modalities may include a forward drive first gear mode, a reverse drive first gear mode, a forward drive second gear mode, and/or a reverse drive second gear mode. It will also be understood that the gear train may be operated in a regenerative mode where torque input from the drive wheels, such as the drive wheels 128 shown in FIG. 1, is transferred to the electric motor-generator and the electric motor-generator converts at least a portion of the drive train's rotational energy into electrical energy. In turn, in the regenerative mode the electric energy may be transferred from the motor-generator to an energy storage device, such as the energy storage device 108 shown in FIG. 1.

Turning to FIG. 20, illustrating the gear train 204 of the electric drive axle system 200 arranged in forward drive first gear mode where the electric motor-generator 202 produces forward drive rotational output, the second clutch assembly 802 is disengaged, and the first clutch assembly 800 is engaged (e.g., configured to transfer energy from the fifth gear 308 to the output shaft 214 via the one-way clutch 902). The power path in the forward drive first gear mode of the gear train 204 is indicated via arrows 2000. Thus, in the forward drive first gear mode, rotational energy is transferred from the electric motor-generator 202 to the first gear 300, from the first gear to the second gear 302, from the fourth gear 306 to the fifth gear 308, from the fifth gear through the first clutch assembly 800 (e.g., through the one-way clutch 902) to the output shaft 214, from the output shaft to the planetary gear assembly 222, from the planetary gear assembly to the differential 224, and from the differential to the axle 838.

FIG. 21 shows the gear train 204 of the electric drive axle system 200 arranged in forward drive second gear mode where the electric motor-generator 202 produces forward drive rotational output, the second clutch assembly 802 is engaged, and the first clutch assembly 800 is disengaged (e.g., the locking clutch 900 is disengaged and the one-way clutch 902 is overrun). It will be understood, that the one-way clutch 902 is overrun due to the ratio of the mesh between the third gear 304 and sixth gear 310 being lower than the ratio of the mesh between the fourth gear 306 and the fifth gear 308, resulting in no load being transferred between the fourth and fifth gear. The power path in the forward drive second gear mode of the gear train 204 is indicated via arrows 2100. Thus, in the forward drive second gear mode, rotational energy is transferred from the electric motor-generator 202 to the first gear 300, from the first gear to the second gear 302, from the third gear 304 to the sixth gear 310, from the sixth gear through the second clutch assembly 802 to the output shaft 214, from the output shaft to the planetary gear assembly 222, from the planetary gear assembly to the differential 224, and from the differential to the axle 838.

FIG. 22 shows the gear train 204 of the electric drive axle system 200 arranged in a regenerative first gear mode where the electric motor-generator 202 generates electrical energy from drive wheel torque transferred to the motor-generator through the gear train 204. Additionally, in the regenerative first gear mode the second clutch assembly 802 is disengaged, and the first clutch assembly 800 is engaged (e.g., configured to transfer energy from the fifth gear 308 to the output shaft 214 via the locking clutch 900). The power path in the regenerative first gear mode of the gear train 204 is indicated via arrows 2200. As such, in the regenerative first gear mode, rotational energy is transferred from the differential 224 to the planetary gear assembly 222, from the planetary gear assembly to the output shaft 214, from the output shaft to the fifth gear 308 through the first clutch assembly 800 (e.g., through the locking clutch 900 bypassing the one-way clutch 902), from the fifth gear to the fourth gear 306, from the second gear 302 to the first gear 300 and then the electric motor-generator 202.

It will be appreciated that during a reverse first gear mode, the power path through the gear train 204 may be similar to the power path shown in FIG. 22. For instance, the power path in the reverse first gear mode may travel through the similar components to the power path denoted via arrows 2200. However, in the reverse power path the arrows are reversed. Therefore, in the reverse first gear mode the second clutch assembly 802 may be disengaged, and the first clutch assembly 800 may be engaged (e.g., configured to transfer torque from the fifth gear 308 to the output shaft 214 via the locking clutch 900).

FIGS. 2-18 and 20-23 are drawn approximately to scale. However, other relative dimensions of the components may be used, in other embodiments.

FIGS. 1-18 and 20-23 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a clutch assembly in a gear train is provided that comprises a locking clutch including: a gear including a plurality of teeth having at least one tooth with a tapered end; an indexing shaft rotationally connected to an output shaft; a shift collar mounted on the indexing shaft, configured to translate on the indexing shaft into an engaged and disengaged configuration, and including a plurality of teeth on a face, where at least one tooth in the plurality of teeth in the shift collar includes a tapered end; and an indexing mechanism coupled to the shift collar and the indexing shaft and configured to accommodate indexing between the indexing shaft and the shift collar during shift collar engagement.

In another aspect, a method for operation of a clutch assembly in a gear train is provided that comprises engaging a tooth with a tapered end in a gear with a tooth having a tapered end in a shift collar, where the clutch assembly comprises: the gear including a plurality of teeth having the tooth with the tapered end; an indexing shaft rotationally connected to an output shaft; the shift collar mounted on the indexing shaft, configured to translate on the indexing shaft into an engaged and disengaged configuration, and including the tooth with the tapered end; and an indexing mechanism coupled to the shift collar and the indexing shaft and configured to accommodate for indexing between the indexing shaft and the shift collar during shift collar engagement.

In yet another aspect, a clutch assembly in a gear train of an electric drive axle is provided that comprises a locking clutch comprising: a gear including a plurality of teeth having at least one tooth with a tapered end; an indexing shaft fixedly connected to an output shaft; a shift collar in splined engagement with the indexing shaft, configured to translate on the indexing shaft into an engaged and disengaged configuration, and including a plurality of teeth on a face, where at least one tooth in the plurality of teeth in the shift collar includes a tapered end; and an indexing mechanism including a spring loaded ball positioned in a recess of the indexing shaft and configured to mate with a ramp in the shift collar and allow the shift collar to index in relation to the indexing shaft during locking clutch engagement.

In any of the aspects or combinations of the aspects, the indexing mechanism may include a spring loaded ball positioned in a recess of the indexing shaft and configured to mate with a ramp in the shift collar.

In any of the aspects or combinations of the aspects, the indexing mechanism may be configured to inhibit indexing between the indexing shaft and the shift collar caused by inertial load during gear train operation.

In any of the aspects or combinations of the aspects, the shift collar may be configured to axially translate along the indexing shaft.

In any of the aspects or combinations of the aspects, the tapered end of the tooth in the gear and the tapered end of the tooth in the shift collar may each include two angled surfaces.

In any of the aspects or combinations of the aspects, the indexing mechanism may include a spring loaded ball positioned in a recess of the indexing shaft interacting with a bi-directional ramp in the shift collar.

In any of the aspects or combinations of the aspects, the tapered end of the tooth in the gear may have a substantially identical angle to an angle of the tapered end of the tooth in the shift collar.

In any of the aspects or combinations of the aspects, an angle of the taper may be greater than 5 degrees.

In any of the aspects or combinations of the aspects, the clutch assembly may further comprise a one-way clutch positioned between the output shaft and the gear; where the one-way clutch may be configured to rotationally engage the gear and the output shaft when a rotational speed in a first direction of the gear exceeds a rotational speed in the first direction of the output shaft in the first direction; and where the one-way clutch may be configured to rotationally disengage the gear and the output shaft when the gear rotates in a second direction opposite the first direction or the rotational speed in the first direction of the output shaft exceeds the rotational speed in the first direction of the gear.

In any of the aspects or combinations of the aspects, the step of engaging the tooth with the tapered end in the gear, may be implemented responsive to receiving a request to transition to a reverse drive mode or a regeneration mode.

In any of the aspects or combinations of the aspects, the tapered end of the tooth in the gear and the tapered end of the tooth in the shift collar may each include two angled surfaces and where the indexing mechanism may include a spring loaded ball positioned in a recess of the indexing shaft interacting with a bi-directional ramp in the shift collar.

In any of the aspects or combinations of the aspects, the clutch assembly may further include a one-way clutch positioned between the output shaft and the gear that is engaged during engagement of the tooth with the tapered end in the gear with the tooth having the tapered end in the shift collar.

In any of the aspects or combinations of the aspects, the indexing mechanism may enable indexing between the indexing shaft and the shift collar during shift collar engagement and inhibits indexing between the indexing shaft and the shift collar caused by inertial load during gear train operation.

In any of the aspects or combinations of the aspects, the tapered end of the tooth in the gear and the tapered end of the tooth in the shift collar may each include two angled surfaces and where the ramp in the shift collar may be a bi-directional ramp.

In any of the aspects or combinations of the aspects, the shift collar may be configured to axially or radially translate along the indexing shaft.

In any of the aspects or combinations of the aspects, the clutch assembly may further comprise a one-way clutch positioned between the output shaft and the gear; where the one-way clutch may be configured to rotationally engage the gear and the output shaft when a rotational speed in a first direction of the gear exceeds a rotational speed in the first direction of the output shaft in the first direction; and where the one-way clutch may be configured to rotationally disengage the gear and the output shaft when the gear rotates in a second direction opposite the first direction or the rotational speed in the first direction of the output shaft exceeds the rotational speed in the first direction of the gear.

In any of the aspects or combinations of the aspects, the clutch assembly may further include a controller including executable instructions stored in non-transitory memory that, responsive to receiving a request to initiate a reverse or regeneration mode transition request, cause the controller to: transition the clutch assembly into an engaged state.

In another representation, a dog clutch is provided in an electrified axle gearbox, the dog clutch includes correspondingly tapered teeth in face of a gear and a face of a shift sleeve and an indexing mechanism configured to allow the shift sleeve to index in relation to an indexing shaft during a transition into a locked state from an unlocked state and configured to inhibit indexing between the shift sleeve and the indexing shaft when the locking clutch is in the unlocked state and the gear rotates.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various vehicle hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A clutch assembly for a gearbox, comprising:
   a clutch including:
      a gear including a plurality of teeth that include at least one tooth with a tapered end and are positioned on a face of the gear, where the gear face is arranged on an axial side of the gear;
      an indexing shaft rotationally connected to a shaft;
      a shift collar mounted on the indexing shaft, configured to translate on the indexing shaft into an engaged and disengaged configuration, and including a plurality of teeth on a face that is arranged on an axial side of the shift collar, where at least one tooth in the plurality of teeth in the shift collar includes a tapered end; and
      a spring loaded ball positioned in a recess of the indexing shaft and configured to mate with a ramp in the shift collar, wherein the spring loaded ball and the ramp are configured to accommodate rotational indexing between the indexing shaft and the shift collar during clutch engagement;
   where the plurality of teeth in the gear are positioned radially outward from the spring loaded ball; and
   where the ramp is positioned between a pair of teeth in the indexing shaft with regard to a circumference of the indexing shaft.

2. The clutch assembly of claim 1, where the tapered end of the tooth in the gear and the tapered end of the tooth in the shift collar each include two angled surfaces and where the ramp is a bi-directional ramp.

3. The clutch assembly of claim 1, further comprising a friction clutch coupled to the shaft.

4. The clutch assembly of claim 3, further comprising a one-way clutch positioned between the shaft and the gear.

5. The clutch assembly of claim 4, where the one-way clutch is a sprag clutch.

6. The clutch assembly of claim 1, where the shaft is an output shaft.

7. The clutch assembly of claim 6, further comprising a planetary gear set coupled to the output shaft and a differential.

8. The clutch assembly of claim 1, where the clutch assembly is included in an electric drive axle.

9. The clutch assembly of claim 8, where the electric drive axle is a beam axle.

10. A method for operation of a clutch assembly in a gear train, comprising:
    engaging a clutch in the clutch assembly, where the clutch assembly comprises:
       a gear including a plurality of teeth that include a tooth with a tapered end, where the plurality of teeth are arranged on a face of the gear and where the gear face is positioned on an axial side of the gear;
       an indexing shaft rotationally connected to a shaft;
       a shift collar mounted on the indexing shaft, configured to translate on the indexing shaft into an engaged and disengaged configuration, and including a tooth with a tapered end, where the tooth in the shift collar is positioned on a face of the shift collar and where the shift collar face is positioned on an axial side of the shift collar; and
       a spring loaded ball positioned in a recess of the indexing shaft and configured to mate with a bi-directional ramp in the shift collar, where the spring loaded ball and the bi-directional ramp are configured to accommodate for indexing between the indexing shaft and the shift collar during clutch engagement;
    where the tapered end of the tooth in the gear and the tapered end of the tooth in the shift collar each include two angled surfaces.

11. The method of claim 10, where the clutch assembly further comprises a one-way clutch positioned between the shaft and the gear and where the one-way clutch is disengaged during clutch engagement.

12. The method of claim 10, where the step of engaging the clutch, is implemented responsive to receiving a request to transition to a reverse drive mode that is generated in response to driver input.

13. The method of claim 10, wherein the clutch is a locking clutch and the locking clutch is engaged while a friction clutch in the gear train is disengaged.

14. A clutch in a vehicle system, comprising:
    a locking clutch including:
       a gear including a plurality of teeth, where the plurality of teeth are arranged on a face of the gear and where the gear face is positioned on an axial side of the gear;
       an indexing shaft rotationally connected to a shaft;
       a shift collar mounted on the indexing shaft, configured to translate on the indexing shaft into an engaged and disengaged configuration, and including a plurality of teeth on a face that is arranged on an axial side of the shift collar; and
       a first spring loaded ball positioned in a recess of the indexing shaft and configured to mate with a ramp in the shift collar, where the first spring loaded ball and the ramp are configured to accommodate indexing between the indexing shaft and the shift collar during clutch engagement;
    where the plurality of teeth in the gear are positioned radially outward from the first spring loaded ball; and
    where the ramp is positioned between a pair of teeth in the indexing shaft with regard to a circumference of the indexing shaft.

15. The clutch of claim 14, where the plurality of teeth in the gear have at least one tooth with a tapered end and where the plurality of teeth in the shift collar have at least one tooth with a tapered end.

16. The clutch of claim 14, further comprising a second spring loaded ball arranged in the indexing shaft.

17. The clutch of claim 16, where the first spring loaded ball and the second spring loaded ball are axially aligned.

18. The clutch of claim 14, where the shaft is an output shaft.

19. The clutch of claim 18, where the gear meshes with a gear coupled to an intermediate shaft.

* * * * *